US010757977B2

(12) United States Patent
Qiu

(10) Patent No.: US 10,757,977 B2
(45) Date of Patent: Sep. 1, 2020

(54) ATOMIZING DEVICE AND ELECTRONIC CIGARETTE HAVING SAME

(71) Applicant: Joyetech (Changzhou) Electronics Co., Ltd., Changzhou (CN)

(72) Inventor: Wei-Hua Qiu, ChangZhou (CN)

(73) Assignee: Joyetech (Changzhou) Electronics Co., Ltd., Changzhou (CN)

( * ) Notice: Subject to any disclaimer, the term of this patent is extended or adjusted under 35 U.S.C. 154(b) by 526 days.

(21) Appl. No.: 15/469,596

(22) Filed: Mar. 27, 2017

(65) Prior Publication Data

US 2017/0196273 A1 Jul. 13, 2017

Related U.S. Application Data

(63) Continuation-in-part of application No. PCT/CN2015/087602, filed on Aug. 20, 2015, and a continuation-in-part of application No. PCT/CN2015/087603, filed on Aug. 20, 2015.

(30) Foreign Application Priority Data

Dec. 12, 2014 (CN) .......................... 2014 1 0765761

(51) Int. Cl.

| | |
|---|---|
| ***F22B 29/06*** | (2006.01) |
| ***A24F 47/00*** | (2020.01) |
| ***H05B 3/16*** | (2006.01) |
| ***H05B 1/02*** | (2006.01) |
| *A01M 13/00* | (2006.01) |

(52) U.S. Cl.

CPC ......... *A24F 47/008* (2013.01); *H05B 1/0244* (2013.01); *H05B 3/16* (2013.01); *H05B 2203/014* (2013.01); *H05B 2203/021* (2013.01)

(58) Field of Classification Search

CPC ....... A24F 47/008; H05B 1/0244; H05B 3/12; H05B 3/141; H05B 3/145; H05B 3/16; H05B 3/24; H05B 3/26; H05B 3/34; H05B 3/37; H05B 2203/014; H05B 2203/015; H05B 2203/021

USPC ....... 392/386, 391, 394, 395, 396, 397, 398, 392/400, 401; 131/273, 328, 329, 360; 219/211, 270

See application file for complete search history.

(56) References Cited

U.S. PATENT DOCUMENTS

| | | | | |
|---|---|---|---|---|
| 2006/0196518 A1* | 9/2006 | Hon | H02J 7/0052 131/360 |
| 2014/0000638 A1 | 1/2014 | Sebastian et al. | |
| 2014/0345606 A1* | 11/2014 | Talon | A24F 47/008 128/202.21 |

FOREIGN PATENT DOCUMENTS

| | | |
|---|---|---|
| CN | 103230100 A | 8/2013 |
| CN | 203618777 U | 6/2014 |
| CN | 203748669 U | 8/2014 |
| CN | 104055225 A | 9/2014 |
| CN | 104382239 A | 3/2015 |

* cited by examiner

*Primary Examiner* — Hung D Nguyen
(74) *Attorney, Agent, or Firm* — ScienBiziP, P.C.

(57) ABSTRACT

An atomizing device is provided. The atomizing device includes a heating member and a temperature control switch. The temperature control switch is positioned adjacent to the heating member or the heating member is sleeved on the temperature control switch. Both of the heating member and the temperature control switch are electrically coupled to a power supply device. An electronic cigarette including the atomizing device is also provided.

7 Claims, 13 Drawing Sheets

ATOMIZING DEVICE AND ELECTRONIC CIGARETTE HAVING SAME

CROSS-REFERENCE TO RELATED APPLICATIONS

This application is a continuation in part of International Patent Application NO. PCT/CN2015/087602, filed on Aug. 20, 2015, and of International Patent Application NO. PCT/CN2015/087603, filed on Aug. 20, 2015, both of which claim priority to Chinese Patent Application NO. CN201410765761.6, filed on Dec. 12, 2014. The contents of all of these specifications are incorporated herein by reference.

FIELD

The subject matter herein generally relates to an electronic cigarette, and particularly to an atomizing device that can sense the temperature change of a heating member and an electronic cigarette including the atomizing device having a temperature control function.

BACKGROUND

An electronic cigarette, also known as a virtual cigarette, is used for replacing a normal cigarette. The electronic cigarette has a similar taste as a cigarette. However, with increasing of an output power of a cell assembly of the electronic cigarette and decreasing of a resistance of a heating member of a atomizing device for the electronic cigarette, a temperature of the heating member can become too high. An excessively high temperature of the heating member may lead the smoke liquid, the wax or the tobacco producing and releasing some substances, which are harmful to health.

SUMMARY OF THE INVENTION

The disclosure provides an atomizing device that can sense the temperature change of a heating member and an electronic cigarette including the atomizing device having a temperature control function.

The technical solution to achieve the embodiment of the disclosure is as follows.

An atomizing device includes a heating member and a temperature control switch. The temperature control switch is positioned adjacent to the heating member or the heating member is sleeved on the temperature control switch. The heating member is coupled to the temperature control switch in series. The heating member and the temperature control switch are electrically coupled to a power supply device.

In an alternative embodiment, the atomizing device further includes a liquid guiding assembly. A portion of the liquid guiding assembly extends into and is in fluid communication with a liquid reservoir. The liquid guiding assembly is sleeved on, twined around, adhered to or clinged to the heating member or the heating member is sleeved on, twined around, adhered to or clinged to the liquid guiding assembly.

In an alternative embodiment, the liquid guiding assembly includes a first liquid guiding member and a second liquid guiding member. A first end of the first liquid guiding member is in fluid communication with the liquid reservoir, and a second end of the first liquid guiding member is coupled to the second liquid guiding member. The first liquid guiding member, the second liquid guiding member, and the heating member are positioned in one of the following arrangements: the heating member is sleeved on, twined around, adhered to or clinged to the second liquid guiding member; or the second liquid guiding member is sleeved on, twined around, adhered to or clinged to the heating member; or the heating member is sleeved on, twined around, adhered to or clinged to the first liquid guiding member; or the first liquid guiding member is sleeved on, twined around, adhered to or clinged to the heating member; or the heating member is defined as the heating member and as the liquid guiding member.

In an alternative embodiment, the heating member is positioned on and in contact with a porous liquid storage member.

In an alternative embodiment, the atomizing device further includes a spray tube and a pneumatic valve. An end of the spray tube is in fluid communication with the liquid reservoir and the pneumatic valve is positioned on a connecting portion, and the connecting portion is positioned between the liquid reservoir and the spray tube.

In an alternative embodiment, the heating member is positioned in the spray tube, and the temperature control switch is positioned in relation to the spray tube includes one of the following arrangements: a arrangement where the temperature control switch is positioned in the spray tube, another arrangement where the temperature control switch is positioned in a spray nozzle of the spray tube, a further arrangement where the temperature control switch is positioned on the spray tube, and a still further arrangement where the temperature control switch is positioned adjacent to the spray tube.

In an alternative embodiment, the atomizing device further includes a container configured for containing wax or tobacco, the heating member is positioned with respect to the container in one of the following arrangements: the heating member is coated on or twined around an outer wall of the container; or the heating member is added to, embedded in, or sandwiched between inner portions of the wall of the container; or the heating member is embedded on or coated on an inner wall of the container; or the heating member is positioned in the container.

An atomizing device includes a heating member and a temperature control switch. The heating member is positioned adjacent to or is sleeved on the temperature control switch. The heating member and the temperature control switch are electrically coupled to a control device respectively.

In an alternative embodiment, the atomizing device further includes a liquid guiding assembly. A portion of the liquid guiding assembly extends into and is in fluid communication with a liquid reservoir. The liquid guiding assembly is sleeved on, twined around, adhered to or clinged to the heating member or the heating member is sleeved on, twined around, adhered to or clinged to the liquid guiding assembly.

In an alternative embodiment, the liquid guiding assembly includes a first liquid guiding member and a second liquid guiding member. A first end of the first liquid guiding member is in fluid communication with the liquid reservoir, a second end of the first liquid guiding member is coupled to the second liquid guiding member. The first liquid guiding member, the second liquid guiding member, and the heating member are positioned in one of the following arrangements: the heating member is sleeved on, twined around, adhered to or clinged to the second liquid guiding member; or the second liquid guiding member is sleeved on, twined around, adhered to or clinged to the heating member; or the heating member is sleeved on, twined around, adhered to or clinged to the first liquid guiding member; or the first liquid guiding member is sleeved on, twined around, adhered to or clinged to the heating member; or the heating member is defined as the heating member and as the liquid guiding member.

In an alternative embodiment, the heating member is positioned on and is in contact with a porous liquid storage member.

In an alternative embodiment, the atomizing device further includes a spray tube and a pneumatic valve. An end of the spray tube is in fluid communication with the liquid reservoir, and the pneumatic valve is positioned on a connecting portion, and the connecting portion is positioned between the liquid reservoir and the spray tube.

In an alternative embodiment, the heating member is positioned in the spray tube, and the positioning of the temperature control switch relative to the spray tube includes one of the following arrangements: an arrangement where the temperature control switch is positioned in the spray tube; another arrangement where the temperature control switch is positioned in a spray nozzle of the spray tube; a further arrangement where the temperature control switch is positioned on the spray tube; and a still further arrangement where the temperature control switch is positioned adjacent to the spray tube.

In an alternative embodiment, the atomizing device further includes a container configured for containing wax or tobacco. The heating member is positioned with respect to the container in one of the following arrangements: the heating member is coated on or twined around an outer wall of the container, or the heating member is added to, embedded in, or sandwiched between inner portions of the wall of the container, or the heating member is embedded on or coated on an inner wall of the container, or the heating member is positioned in the container.

An atomizing device includes a heating member and a temperature sensor. The heating member and the temperature sensor are positioned in one of the following arrangements: the heating member and the temperature sensor are not directly and electrically coupled to each other, but electrically coupled to a control device independently; or the heating member and the temperature sensor are directly and electrically coupled to each other, and then electrically coupled to the control device.

In an alternative embodiment, the atomizing device further includes a liquid guiding assembly. A portion of the liquid guiding assembly extends into and is in fluid communication with a liquid reservoir. The liquid guiding assembly is clinged to or positioned adjacent to the temperature sensor. The liquid guiding assembly and the heating member are positioned in one of the following arrangements: the liquid guiding assembly and the temperature sensor are cooperatively sleeved on, twined around, adhered to or clinged to the heating member; or only the liquid guiding assembly is sleeved on, twined around, adhered to or clinged to the heating member; or the heating member is sleeved on, twined around, adhered to or clinged to both of the liquid guiding assembly and the temperature sensor; or the heating member is only sleeved on, twined around, adhered to or clinged to the liquid guiding assembly.

In an alternative embodiment, the liquid guiding assembly includes a first liquid guiding member and a second liquid guiding member. A first end of the first liquid guiding member is in fluid communication with the liquid reservoir, and a second end of the first liquid guiding member is coupled to the second liquid guiding member. The first liquid guiding member, the second liquid guiding member, and the heating member are positioned in one of the following arrangements: the second liquid guiding member is clinged to or positioned adjacent to the temperature sensor, and the heating member is sleeved on, twined around, adhered to or clinged to both of the second liquid guiding member and the temperature sensor, alternatively in this arrangement, the heating member can be sleeved on, twined around, adhered to or clinged to the second liquid guiding member only; or the second liquid guiding member is adhered to, clinged to or positioned adjacent to the temperature sensor, and the second liquid guiding member and the temperature sensor may be cooperatively sleeved on, twined around, adhered to or clinged to the heating member, alternatively in this arrangement, only the second liquid guiding member may be sleeved on, twined around, adhered to or clinged to the heating member; or the heating member is sleeved on or coated on the temperature sensor, the second liquid guiding member is sleeved on or twined around the heating member; or the temperature sensor is positioned adjacent to, adhered to or clinged to the first liquid guiding member, and the heating member may be sleeved on, twined around, adhered to or clinged to both of the first liquid guiding member and the temperature sensor, or it may be that the heating member is sleeved on, twined around, adhered to or clinged to the first liquid guiding member only; or the temperature sensor is positioned adjacent to, adhered to or clinged to the first liquid guiding member, and the first liquid guiding member and the temperature sensor are together sleeved on, twined around, adhered to or clinged to the heating member, or it may be that only the first liquid guiding member is sleeved on, twined around, adhered to or clinged to the heating member; or the heating member is sleeved on or coated on the temperature sensor and the first liquid guiding member is sleeved on or twined around the heating member; or the heating member also functions as the temperature sensor; or the heating member acts as the heating member, as the liquid guiding member, and as the temperature sensor simultaneously.

In an alternative embodiment, the atomizing device further includes a liquid guiding assembly. A portion of the liquid guiding assembly extends into and is in fluid communication with a liquid reservoir. The heating member and the temperature sensor can be together sleeved on, twined around, adhered to or clinged to the liquid guiding assembly, or the liquid guiding assembly is sleeved on, twined around, adhered to or clinged to both of the heating member and the temperature sensor.

In an alternative embodiment, the liquid guiding assembly includes a first liquid guiding member and a second liquid guiding member. A first end of the first liquid guiding member is in fluid communication with the liquid reservoir, a second end of the first liquid guiding member is coupled to the second liquid guiding member. The first liquid guiding member, the second liquid guiding member, and the heating member are positioned in one of the following arrangements: the heating member and the temperature sensor are together sleeved on, twined around, adhered to or clinged to the second liquid guiding member; or the second liquid guiding member is sleeved on, twined around, adhered to or clinged to both of the heating member and the temperature sensor; or the heating member and the temperature sensor are together sleeved on, twined around, adhered to or clinged to the first liquid guiding member; or the first liquid guiding member is sleeved on, twined around, adhered to or clinged to both of the heating member and the temperature sensor; or a temperature sensing material is coated on the surface of the heating member; or the heating member is defined as the heating member and as the temperature sensor.

In an alternative embodiment, the heating member is positioned on and is in contact with a porous liquid storage member. The temperature sensor and the heating member are positioned in one of the following arrangements: the temperature sensor is clinged to or positioned adjacent to the heating member; or the temperature sensor is coated on, twined around, or sleeved on the heating member; or the heating member is coated on, twined around, or sleeved on the temperature sensor.

In an alternative embodiment, the atomizing device further includes a spray tube and a pneumatic valve. An end of the spray tube is in fluid communication with the liquid reservoir and the pneumatic valve is positioned on a connecting portion, and the connecting portion is positioned between the liquid reservoir and the spray tube.

In an alternative embodiment, the heating member is positioned in the spray tube. The temperature sensor is positioned in one of the following arrangements: the temperature sensor is positioned in the spray tube; or the temperature sensor is positioned in a spray nozzle of the spray tube; or the temperature sensor is positioned on the spray tube; or the temperature sensor is positioned adjacent to the spray tube; or the temperature sensor is coated on, twined around, sleeved on, adhered to or clinged to the heating member; or the heating member is coated on, twined around, sleeved on, adhered to or clinged to the temperature sensor.

In an alternative embodiment, the atomizing device further includes a container configured for containing wax or tobacco. The heating member is positioned to the container in one of the following arrangements: the heating member is coated on or twined around an outer wall of the container; or the heating member is added to, embedded in, or sandwiched between inner portions of the wall of the container; or the heating member is embedded on or coated on an inner wall of the container, or the heating member is positioned in the container. The temperature sensor is positioned in one of the following arrangements: the temperature sensor is sleeved on, coated on, or twined around the heating member; or the temperature sensor is positioned adjacent to or clinged to the heating member; or the heating member is defined as the heating member and as the temperature sensor.

In an alternative embodiment, an insulating bushing is sleeved on the temperature sensor or an insulation coating can be coated on the temperature sensor.

An atomizing device includes a heating member electrically coupled to a control device, the heating member has temperature coefficient of resistance characteristics.

In an alternative embodiment, the heating member is made of one or more materials selected from at least of the following components: Pt, Cu, Ni, Ti, Fe, ceramic based positive temperature coefficient (PTC) materials, and polymer based PTC materials.

In an alternative embodiment, the atomizing device further includes a liquid guiding assembly. A portion of the liquid guiding assembly extends into and is in fluid communication with a liquid reservoir. The liquid guiding assembly is sleeved on, twined around, adhered to or clinged to the heating member, or the heating member can be sleeved on, twined around, adhered to or clinged to the liquid guiding assembly.

In an alternative embodiment, the liquid guiding assembly includes a first liquid guiding member and a second liquid guiding member. A first end of the first liquid guiding member is in fluid communication with the liquid reservoir, and a second end of the first liquid guiding member is coupled to the second liquid guiding member. The first liquid guiding member, the second liquid guiding member, and the heating member are positioned in one of the following arrangements: the heating member is sleeved on, twined around, adhered to or clinged to the second liquid guiding member; or the second liquid guiding member is sleeved on, twined around, adhered to or clinged to the heating member; or the heating member is sleeved on, twined around, adhered to or clinged to the first liquid guiding member; or the first liquid guiding member is sleeved on, twined around, adhered to or clinged to the heating member; or the heating member is defined as the heating member and as the liquid guiding member.

In an alternative embodiment, the heating member is positioned on and is in contact with a porous liquid storage member.

In an alternative embodiment, the atomizing device further includes a spray tube and a pneumatic valve. An end of the spray tube is in fluid communication with the liquid reservoir and the pneumatic valve is positioned on a connecting portion, and the connecting portion is positioned between the liquid reservoir and the spray tube.

In an alternative embodiment, the heating member is positioned in the spray tube.

In an alternative embodiment, the atomizing device further includes a container configured for containing wax or tobacco. The heating member is positioned to the container in one of the following arrangements: the heating member is coated on or twined around an outer wall of the container; or the heating member is added to, embedded in, or sandwiched between inner portions of the wall of the container; or the heating member is embedded on or coated on an inner wall of the container; or the heating member is positioned in the container.

An electronic cigarette includes one of the atomizing devices described above and a power supply device. The atomizing device is electrically coupled to the power supply device.

In an alternative embodiment, the electronic cigarette further includes a control device. The atomizing device is electrically coupled to the control device and the control device is electrically coupled to the power supply device.

In an alternative embodiment, the electronic cigarette further includes a liquid driving device. An end of the liquid driving device is in fluid communication with the liquid reservoir and the liquid driving device is electrically coupled to the control device.

In an alternative embodiment, the liquid driving device is selected from at least one of the following components: a micropump, a hyperelastic body, an air bag, and a memory alloy.

Advantages can be described as following. First, the atomizing device can sense the temperature change of the heating member. The electronic cigarette having the atomizing device can maintain the temperature of the heating member within a reasonable range, to avoid producing and releasing substances that are harmful to health. The taste of the smoke is maintained, energy is saved, overheating a shell of the electronic cigarette is avoided, and thermal aging of internal components of the electronic cigarette is also avoided. Second, maintaining the temperature of the heating member within the reasonable range can effectively prevent the liquid guiding element from carbonizing or fragmenting. Third, maintaining the temperature of the heating member within the reasonable range removes a risk of injury to a user. Fourth, the temperature is directly controlled through the temperature control switch, thus the structure is simply and easily realized. Fifth, the heating member and the temperature control switch are not directly and electrically coupled to each other in series, but independently and electrically coupled to a control device, so as to expand range of choosing temperature control switch. Sixth, the control device can connect and disconnect circuit between the heating member and the power supply device to adjust the temperature of the heating member through a control circuit; in this arrangement, a regulating circuit can replace the switch circuit to increase or decrease the temperature of the heating member. The output voltage/the output power to the heating member from the supply device can be supplied variably under the control of the regulating circuit, so as to increase or decrease the temperature of the heating member, to avoid cooling down too rapidly when the temperature of the heating member has been too high and affecting the user's enjoyment. Seventh, the temperature of the heating member can be calculated depending on the pre-stored relational data between the resistance value of the temperature sensor and the temperature of the temperature sensor and an operational formula of the heating member's temperature. Eighth, the user can enter the needed target temperature $T_D$ ($T_L \le T_D \le T_H$) to maintain the temperature of the heating member in $T_D$ through an input unit that is electrically coupled to a processor; ninth, the heating member can directly transmit a change of temperature to the control device, there is no need to position the temperature control switch or the temperature sensor relatively, this simplifies the structure, saves space, and simplifies the operation process of the control device.

BRIEF DESCRIPTION OF THE DRAWINGS

Implementations of the present technology will now be described, by way of example only, with reference to the attached figures.

Figure 1:
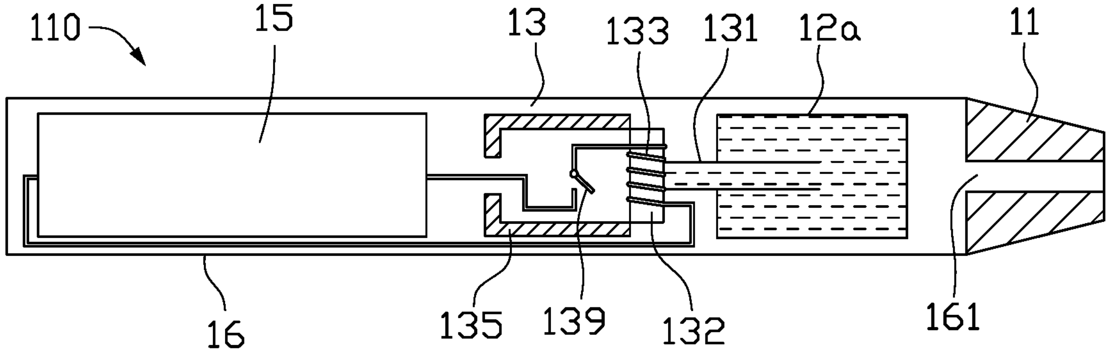
FIG. 1 is a schematic diagram of a first embodiment of an electronic cigarette.

In the attached figures, electronic cigarettes are labeled as 110, 120, 130, 140, 150, 210, 220, 230, 240, 310, 320, 330, 340, 410, 420, 430, and 440. Suction nozzles are labeled as 11, 21, 31, and 41. Liquid reservoir are labeled as 12*a* and 32*a*. Porous liquid storage member is labeled as 22*b*. Atomizing devices are labeled as 13, 23, 33, and 43. First liquid guiding member is labeled as 131. Second liquid guiding member is labeled as 132. A first end of the first liquid guiding member is labeled as 1313. A second end of the first liquid guiding member is labeled as 1311. Heating members are labeled as 133, 233, 333, and 433. Temperature sensors are labeled as 134, 234, 334, and 434. Atomizer seats are labeled as 135 and 235. Spray tube is labeled as 336. Pneumatic valve is labeled as 337. Container is labeled as 438. Temperature control switches are labeled as 139, 239, 339, and 439. Control devices are labeled as 14, 24, 34, and 44. Detecting circuit is labeled as 141. Processor is labeled as 142. Switch circuit is labeled as 143. Input unit is labeled as 145. Power supply devices are labeled as 15, 25, 35, and 45. Shells are labeled as 16, 26, 36, and 46. Vent holes are labeled as 161, 261, 361, and 461, and micropump is labeled as 37.

DETAILED DESCRIPTION

It will be appreciated that for simplicity and clarity of illustration, where appropriate, reference numerals have been repeated among the different figures to indicate corresponding or analogous members. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

First Embodiment

FIG. 1 illustrates an electronic cigarette 110. The electronic cigarette 110 can include a suction nozzle 11, a liquid reservoir 12*a*, an atomizing device 13, a power supply device 15, and a shell 16. An end of the suction nozzle 11 can be coupled to the shell 16. All of the liquid reservoir 12*a*, the atomizing device 13, and the power supply device 15 can be positioned in the shell 16. The atomizing device 13 can be electrically coupled to the power supply device 15. An end of the shell 16 that is adjacent to the suction nozzle 11 can define a vent hole 161. The vent hole 161 can be in fluid communication with the suction nozzle 11. Smoke liquid received in the liquid reservoir 12*a* can be carried to the atomizing device 13. After the atomizing device 13 is driven by the power supply device 15, the smoke liquid can be heated and atomized, thus the user can enjoy a smoking experience.

The atomizing device 13 can include a first liquid guiding member 131, a second liquid guiding member 132, a heating member 133, a temperature control switch 139, and an atomizer seat 135. The first liquid guiding member 131 has two ends. A first end 1313 of the first liquid guiding member 131 can be in fluid communication with the liquid reservoir 12*a*, and a second end 1311 of the first liquid guiding member 131 can be coupled to the second liquid guiding member 132. The smoke liquid received in the liquid reservoir 12*a* can thus be carried to the second liquid guiding member 132 through capillary action as exemplary embodiment shown in FIG. 1. In an alternative embodiment, the second liquid guiding member 132 can be in fluid communication with the liquid reservoir 12*a* directly, for example, the second liquid guiding member 132 can include a liquid guiding bulge or pouch (not shown) that extends into and is in fluid communication with the liquid reservoir 12*a*. The smoke liquid stored in the liquid reservoir 12*a* can thus be carried to other portions of the second liquid guiding member 132 through the liquid guiding bulge or pouch, thus the first liquid guiding member 131 can be omitted. The heating member 133 can be sleeved on, twined around, adhered to or clinged to the second liquid guiding member 132. In an alternative embodiment, the second liquid guiding member 132 can be sleeved on, twined around, adhered to or clinged to the heating member 133. In an alternative embodiment, the heating member 133 can be sleeved on, twined around, adhered to or clinged to the first liquid guiding member 131, and the second liquid guiding member 132 can be omitted. In an alternative embodiment, the first liquid guiding member 131 can be sleeved on, twined around, adhered to or clinged to the heating member 133, and the second liquid guiding member 132 can be omitted. In an alternative embodiment, the heating member 133 can function as the heating member but also function as the liquid guiding members, for example, the heating member 133 can be a porous heating member made of ceramic, then both of the first liquid guiding member 131 and the second liquid guiding member 132 can be omitted. The temperature control switch 139 can be positioned adjacent to the heating member 133 or the heating member 133 can be sleeved on the temperature control switch 139. The temperature control switch 139 can be electrically coupled to the heating member 133 in series. Both of the heating member 133 and the temperature control switch 139 can be electrically coupled to the power supply device 15. The atomizer seat 135 can be configured as a fixing base for at least one of the following components: the first liquid guiding member 131, the second liquid guiding member 132, the heating member 133, the temperature control switch 139, and other components, so each component can be received and fastened in the atomizing device 13.

The temperature control switch 139 has the following properties: when a temperature $t_s$ of the temperature control switch 139 is less than an operating temperature $T_M$, the temperature control switch 139 is switched on; when the temperature $t_s$ of the temperature control switch 139 is greater than the operating temperature $T_M$, the temperature control switch 139 is switched off. The operating temperature $T_M$ of the temperature control switch 139 can be slightly lower than an upper operating temperature $T_H$ of the heating member 133 since the temperature $t_s$ of the temperature control switch 139 is always slightly lower than the temperature t of the heating member 133. The temperature control switch 139 can be selected from at least one of the following components: a mechanical temperature control switch, an electronic temperature control switch, a temperature relay, and a combination thereof. The mechanical temperature control switch 139 can include a steam pressure type temperature control switch (not shown), a liquid expansion type temperature control switch (not shown), a gas adsorption type temperature control switch (not shown), and a metal expansion type temperature control switch (not shown). The metal expansion type temperature control switch can include a bimetallic strip switch (not shown) and a memory alloy switch (not shown). The electronic temperature control switch can include a resistance type temperature control switch (not shown) and a thermocouple type temperature control switch (not shown). The temperature relay can include a thermal reed relay (not shown).

A temperature control process of the electronic cigarette 110 is as follows. When the temperature $t_s$ of the temperature control switch 139 is less than the operating temperature $T_M$, the temperature control switch 139 allows power from the power supply device 15 to reach the heating member 133. When the heating member 133 starts to heat up, the temperature t of the heating member 133 starts to rise, and the temperature $t_s$ of the temperature control switch 139 also starts to rise. When the temperature $t_s$ of the temperature control switch 139 is greater than the operating temperature $T_M$, the temperature control switch 139 switches off the connection between the power supply device 15 and the heating member 133, then the heating member 133 stops working. The temperature t of the heating member 133 and the temperature $t_s$ of the temperature control switch 139 drop naturally until the temperature $t_s$ of the temperature control switch 139 is less than the operating temperature $T_M$. When $t_s$ is lower than $T_M$, the temperature control switch 139 again interconnects the power supply device 15 and the heating member 133 to allow the heating member 133 to heat up again.

In an alternative embodiment, the atomizing device 13 can include two or more heating members 133 and the same number of temperature control switches 139 as the heating members 133. A relationship between the heating member 133 and the temperature control switch 139 can be the same as in the first embodiment. In an alternative embodiment, the number of the heating members 133 is not equal to the number of the temperature control switches 139. The atomizing device 13 can include at least one temperature control switch 139.

In the first embodiment, the atomizing device 13 can have a simple structure, and the temperature t of the heating member 133 can be controlled by the temperature control switch 139 alone.

Second Embodiment

Figure 2:
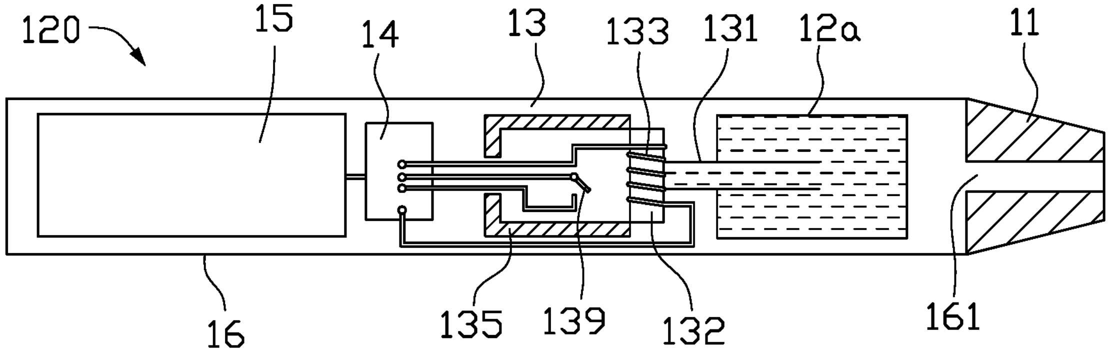
FIG. 2 is a schematic diagram of a second embodiment of the electronic cigarette.

FIG. 2 illustrates an electronic cigarette 120. A difference between the electronic cigarette 120 of the second embodiment and the electronic cigarette 110 of the first embodiment is as follows. The heating member 133 and the temperature control switch 139 are not directly and electrically coupled to each other in series, but each one is coupled independently to a control device 14. The control device 14 is electrically coupled to the power supply device 15. The temperature control switch 139 can have one of the following characteristics, wherein each characteristics may signify a plurality of properties: the first is that the temperature control switch 139 can be switched on when the temperature $t_s$ of the temperature control switch 139 is less than the operating temperature $T_M$, and can be switched off when greater; the second is the opposite of the above, namely, the temperature control switch 139 can be switched off when the temperature $t_s$ of the temperature control switch 139 is less than the operating temperature $T_M$, and can be switched on when greater.

Figure 3:
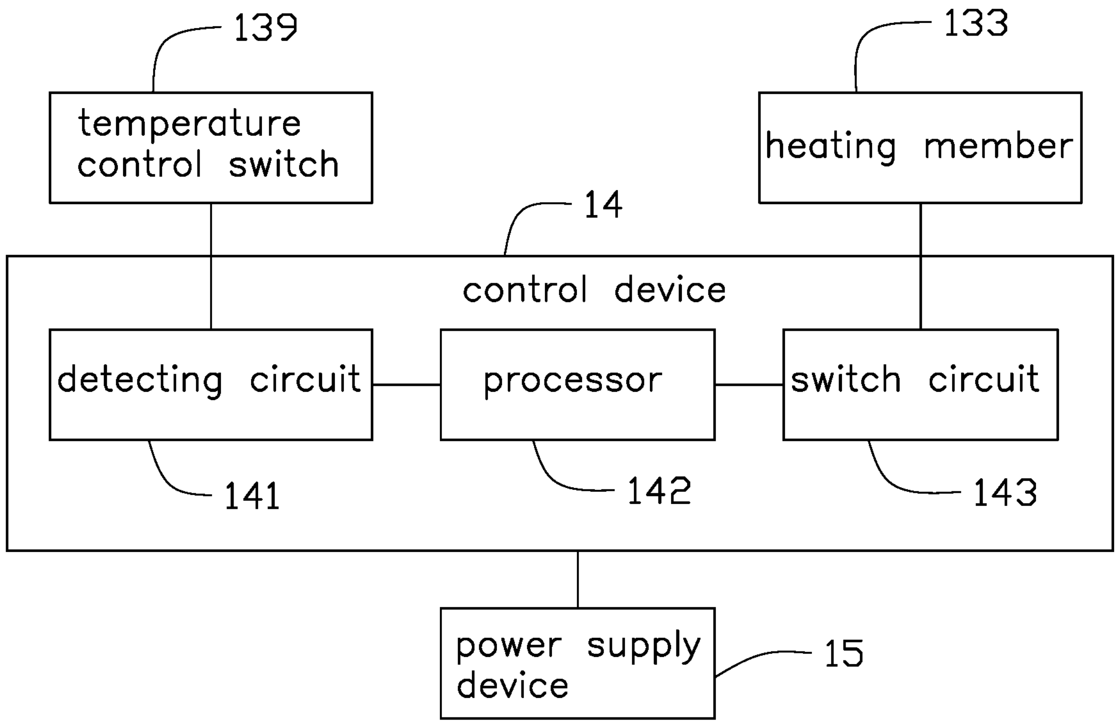
FIG. 3 is a block diagram of a circuit of the second embodiment of the electronic cigarette.

FIG. 3 illustrates that the control device 14 can include a detecting circuit 141, a processor 142, and a switch circuit 143. The detecting circuit 141 can be electrically coupled to the temperature control switch 139 and can monitor the action of the temperature control switch 139 in real time, and feedback to the processor 142. With the increase of the temperature t of the heating member 133, the temperature $t_s$ of the temperature control switch 139 is also increased. "Action A" as hereinafter used can mean the temperature control switch 139 being switched on or can mean the temperature control switch 139 being switched off. "Action B" as used hereinafter means in one event opposite of action A. For example, if Action A is to switch "on" a component, Action B is to switch "off" the component. When the temperature $t_s$ of the temperature control switch 139 is less than the operating temperature $T_M$, the temperature control switch 139 can execute action A; when the temperature $t_s$ of the temperature control switch 139 is greater than the operating temperature $T_M$, the temperature control switch 139 can execute action B. The processor 142 can switch on or switch off the switch circuit 143 according to the action of the temperature control switch 139. The switch circuit 143 electrically coupled to the heating member 133 can be configured to switch on and allow power to the heating member 133 from the power supply device 15. The switch circuit 143 is also configured to cut off the power to the heating member 133 from the power supply device 15.

The temperature control process of the electronic cigarette 120 is as follows. When the temperature control switch 139 executes action A, the processor 142 can switch on the switch circuit 143, and then the power supply device 15 can supply power to the heating member 133, the temperature t of the heating member 133 starts to rise, and the temperature $t_s$ of the temperature control switch 139 also starts to rise. When the temperature control switch 139 executes action B, the processor 142 can switch off the switch circuit 143, and then the power supply device 15 can stop supplying power to the heating member 133. The temperature t of the heating member 133 and the temperature $t_s$ of the temperature control switch 139 drops naturally until the temperature $t_s$ of the temperature control switch 139 is less than the operating temperature $T_M$. When $t_s$ is lower than $T_M$, the temperature control switch 139 can execute action A again. The processor 142 can switch on the switch circuit 143 between the power supply device 15 and the heating member 133 again. In this arrangement, the heating member 133 starts to work again.

In an alternative embodiment, the switch circuit 143 can be replaced by an adjusting circuit. When the temperature control switch 139 executes action B, the adjusting circuit can adjust the power supply device 15 to decrease the output voltage/output power supplied to the heating member 133. When the temperature control switch 139 executes action A and the output voltage/output power of the power supply device 15 supplied to the heating member 133 is not up to a maximum output voltage/output power, the adjusting circuit can adjust the power supply device 15 to increase the output voltage/output power supplied to the heating member 133. When the temperature control switch 139 executes action A and the output voltage/output power of the power supply device 15 supplied to the heating member 133 is up to the maximum output voltage/output power, the adjusting circuit can adjust the power supply device 15 to maintain the output voltage/output power supplied to the heating member 133.

In an alternative embodiment, the atomizing device 13 can include two or more heating members 133 and the same number of temperature control switches 139 as the heating members 133. The relationship between the heating member 133 and the temperature control switch 139 can be the same as that in the second embodiment. In an alternative embodiment, the number of the heating members 133 is not equal to the number of the temperature control switches 139. The atomizing device 13 can include at least one temperature control switch 139.

In the second embodiment, the heating member 133 and the temperature control switch 139 is not directly and electrically coupled to each other in series, but each one is coupled independently to a control device 14. Advantages of the electronic cigarette 120 can be described as follows.

The choice of the temperature control switch 139 can be wider, so long as the temperature control switch 139 can have one of the following properties: the temperature control switch 139 is switched on when the temperature $t_s$ of the temperature control switch 139 is less than the operating temperature $T_M$, and switched off when greater; or the temperature control switch 139 is switched off when the temperature $t_s$ of the temperature control switch 139 is less than the operating temperature $T_M$, and switched on when greater.

The control device can connect or disconnect circuit between the heating member 133 and the power supply device 15 to adjust the temperature t of the heating member 133, or the output voltage/output power to the heating member 133 can be supplied variably under a control of the regulating circuit to adjust the temperature t of the heating member 133, thus preventing the cool down from cooling too rapidly when the temperature t of the heating member was too high to begin with and in turn affects the user's enjoyment.

Third Embodiment

Figure 4:
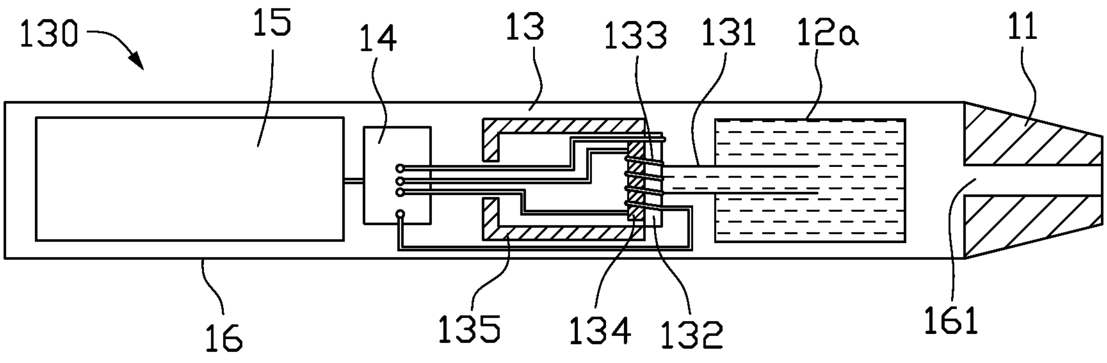
FIG. 4 is a schematic diagram of a third embodiment of the electronic cigarette.
Figure 5:
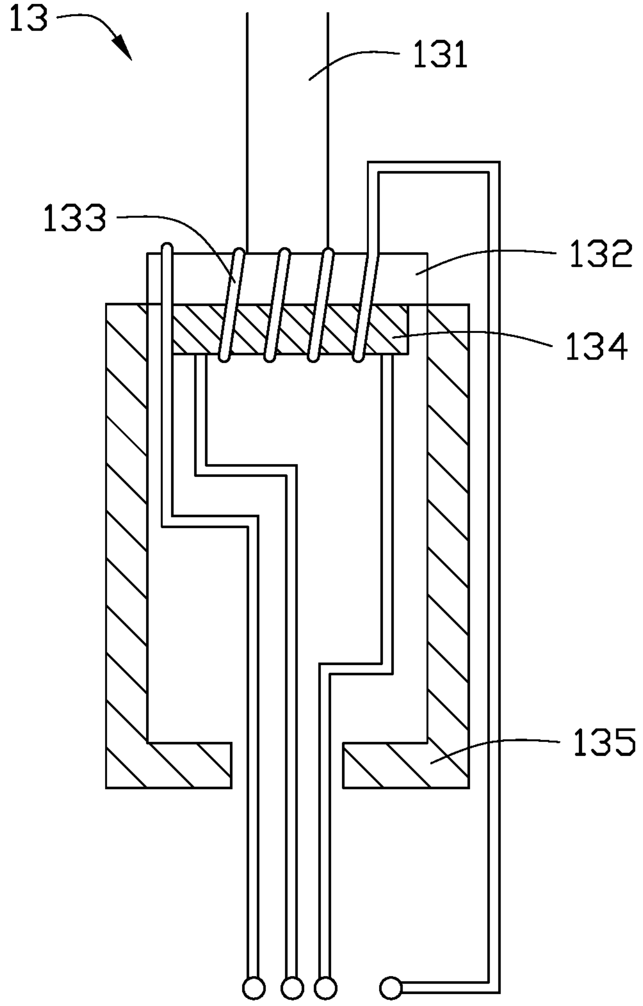
FIG. 5 is a schematic diagram of a third embodiment of an atomizing device.

FIGS. 4-5 illustrate an electronic cigarette 130. The difference between the electronic cigarette 130 of the third embodiment and the electronic cigarette 120 of the second embodiment is as follows. A temperature sensor 134 replacing the temperature control switch 139 can be electrically coupled to the control device 14.

The second liquid guiding member 132 can be positioned adjacent to or clinged to the temperature sensor 134. The heating member 133 may be sleeved on, twined around, adhered to or clinged to both of the second liquid guiding member 132 and the temperature sensor 134 or it may be that the heating member 133 is sleeved on, twined around, adhered to or clinged to the second liquid guiding member 132 only. In an alternative embodiment, the second liquid guiding member 132 can be positioned adjacent to or clinged to the temperature sensor 134, either the second liquid guiding member 132 and the temperature sensor 134 are cooperatively sleeved on, twined around, adhered to or clinged to the heating member 133, or only the second liquid guiding member 132 is sleeved on, twined around, adhered to or clinged to the heating member 133. In an alternative embodiment, the temperature sensor 134 is sleeved on or coated on the heating member 133, the second liquid guiding member 132 is sleeved on or twined around the heating member 133. In an alternative embodiment, the temperature sensor 134 can be positioned adjacent to or clinged to the first liquid guiding member 131, and the heating member 133 may be sleeved on, twined around, adhered to or clinged to both of the first liquid guiding member 131 and the temperature sensor 134, or it may be that the heating member 133 is sleeved on, twined around, adhered to or clinged to the first liquid guiding member 131 only, the second liquid guiding member 132 can be omitted. In an alternative embodiment, the temperature sensor 134 can be positioned adjacent to or clinged to the first liquid guiding member 131, and the first liquid guiding member 131 and the temperature sensor 134 may be together sleeved on, twined around, adhered to or clinged to the heating member 133, or it may be that only the first liquid guiding member 131 is sleeved on, twined around, adhered to or clinged to the heating member 133, the second liquid guiding member 132 can be omitted. In an alternative embodiment, the temperature sensor 134 is sleeved on or coated on the heating member 133, the first liquid guiding member 131 is sleeved on or twined around the heating member 133, the second liquid guiding member 132 can be omitted. In an alternative embodiment, the heating member 133 can also function as the temperature sensor, for example, the heating member 133 can be made of ceramic based PTC material, and the temperature sensor 134 can be omitted. In an alternative embodiment, the heating member 133 can act as the heating member, as the liquid guiding member, and as the temperature sensor simultaneously, for example, the heating member 133 can be a porous ceramic based PTC heating member, and all of the first liquid guiding member 131, the second liquid guiding member 132, and the temperature sensor 134 can be omitted. The heating member 133 and the temperature sensor 134 are not directly and electrically coupled to each other in series, but each one is coupled independently to the control device 14. In an alternative embodiment, the heating member 133 and the temperature sensor 134 can be directly and electrically coupled to each other, and then electrically coupled to the control device 14. The atomizer seat 135 can be configured as the fixing base for at least one component of the following components: the first liquid guiding member 131, the second liquid guiding member 132, the heating member 133, the temperature sensor 134, and other components, so each component can be received and fastened in the atomizing device 13. Either an insulating bushing (not shown) is sleeved on the temperature sensor 134 or an insulation coating (not shown) is coated on the temperature sensor 134, to prevent direct contact between the temperature sensor 134 and the heating member 133. In the illustrated embodiment, the temperature sensor 134 can be a PTC thermistor.

Figure 6:
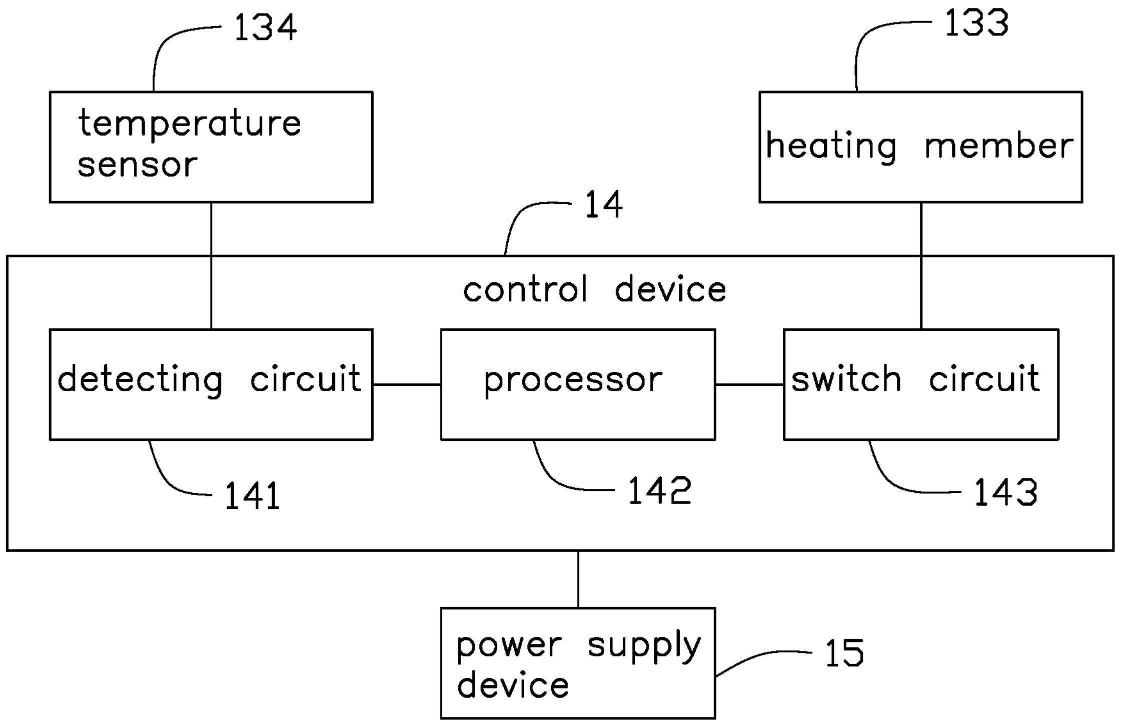
FIG. 6 is a block diagram of a first circuit of the third embodiment of the electronic cigarette.

FIG. 6 illustrates a control device 14 that includes a detecting circuit 141, a processor 142, and a switch circuit 143. The detecting circuit 141 electrically coupled to the temperature sensor 134 can monitor the resistance R of the temperature sensor 134 in real time, and feedback the resistance R of the temperature sensor 134 to the processor 142. The processor 142 can pre-store the relational data between the resistance value R of the temperature sensor 134 and the temperature T of the temperature sensor 134, an operational formula of the heating member's temperature t, an upper operating temperature $T_H$ of the heating member 133, and a lower operating temperature $T_L$ of the heating member 133. The operational formula is described as follows: $t=T+\Delta T$, $\Delta T$ means the difference between the temperature T of the temperature sensor 134 and the temperature t of the heating member 133 that are achieved from tests. The processor 142 can calculate the temperature t of the heating member 133, and then can compare the temperature t of the heating member 133 with the upper operating temperature $T_H$ and the lower operating temperature $T_L$ of the heating member 133, and then can control the switch circuit 143 to switch on or switch off according to the result of the comparison. The switch circuit 143 electrically coupled to the heating member 133 can be configured to switch on and allow power to the heating member 133 from the power supply device 15. The switch circuit 143 is also configured to cut off the power to the heating member 133 from the power supply device 15.

The temperature control process of the electronic cigarette 130 is as follows. The temperature T of the temperature sensor 134 can rise with the rising temperature t of the heating member 133. The resistance value R of the temperature sensor 134 can be increased with the rising temperature T of the temperature sensor 134. The detecting circuit 141 can monitor the resistance R of the temperature sensor 134 in real time, and feedback the resistance R of the temperature sensor 134 to the processor 142. The processor 142 can calculate the temperature T of the temperature sensor 134 according to the relational data between the resistance value R of the temperature sensor 134 and the temperature T of the temperature sensor 134, and then can calculate the temperature t of the heating member 133 according to the following operational formula: $t=T+\Delta T$, and then can compare the temperature t of the heating member 133 with the upper operating temperature $T_H$ and the lower operating temperature $T_L$ of the heating member 133, and then can control the switch circuit 143 to switch on or switch off according to the result of comparison. When the temperature t of the heating member 133 is less than the upper operating temperature $T_H$, the processor 142 can control the switch circuit 143 to be switched on, and then the power supply device 15 can supply power to the heating member 133, the temperature t of the heating member 133 can rise; when the temperature t of the heating member 133 is greater than the upper operating temperature $T_H$, the processor 142 can control the switch circuit 143 to be switched off, and then the power supply device 15 can stop supplying power to the heating member 133, the temperature t of the heating member 133 can drop naturally until the temperature t of the heating member 133 is equal to the lower operating temperature $T_L$. When the temperature t is equal to the lower operating temperature $T_L$, the power supply device 15 can start to supply power to the heating member 133 again.

In an alternative embodiment, the switch circuit 143 can be replaced by an adjusting circuit. When the temperature t of the heating member 133 is greater than the upper operating temperature $T_H$, the adjusting circuit can adjust the power supply device 15 to decrease the output voltage/output power supplied to the heating member 133. When the temperature t of the heating member 133 is less than the lower operating temperature $T_L$ and the output voltage/output power of the power supply device 15 supplied to the heating member 133 is not up to a maximum output voltage/ output power, the adjusting circuit can adjust the power supply device 15 to increase the output voltage/output power supplied to the heating member 133. When the temperature t of the heating member 133 is less than the lower operating temperature $T_L$ and the output voltage/output power of the power supply device 15 supplied to the heating member 133 is up to the maximum output voltage/output power, the adjusting circuit can adjust the power supply device 15 to maintain the output voltage/output power supplied to the heating member 133.

Figure 7:
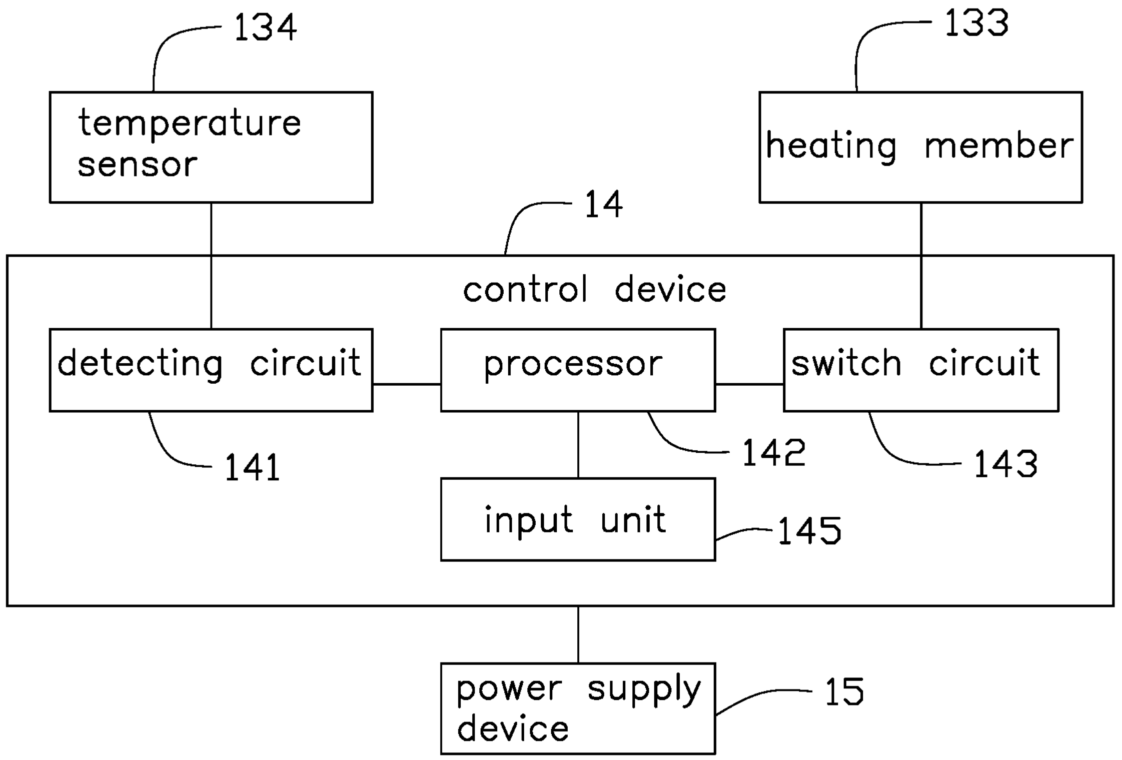
FIG. 7 is a block diagram of a second circuit of the third embodiment of the electronic cigarette.

FIG. 7 illustrates that the electronic cigarette 130 can further include an input unit 145 electrically coupled to the processor 142. The input unit 145 can be a physical key or a touch panel for input. The user can enter the target temperature $T_D(T_L \leq T_D \leq T_H)$ through the input unit 145. The processor 142 can compare the temperature t of the heating member 133 with the target temperature $T_D$. When the temperature t is less than the temperature $T_D$, the processor 142 can control the switch circuit 143 to be switched on, and then the power supply device 15 can supply power to the heating member 133, and the temperature t of the heating member 133 can rise; when the temperature t is greater than the temperature $T_D$, the processor 142 can control the switch circuit 143 to be switched off, and then the power supply device 15 can stop supplying power to the heating member 133, and the temperature t of the heating member 133 can drop naturally. In an alternative embodiment, the switch circuit 143 can be replaced by an adjusting circuit that is configured to adjust the output voltage/output power of the power supply device 15 supplied to the heating member 133.

In an alternative embodiment, the temperature sensor 134 can be a negative temperature coefficient (NTC) thermistor, a bimetallic strip, a thermocouple, a quartz crystal temperature sensor, an optical fiber temperature sensor, an infrared temperature sensor, or a P-N junction temperature sensor. The detecting circuit 141 can monitor a physical quantity x in real time. The physical quantity x can correspond to the temperature T of the temperature sensor 134 and can be one of the following components: the resistance, the bending degree caused by thermal expansion, the thermoelectric voltage, the oscillation frequency, the optical power, the thermal radiation, or reverse saturation current. The processor 142 can calculate the temperature T of the temperature sensor 134 according to the corresponding relational data between the physical quantity x of the temperature sensor 134 and the temperature T of the temperature sensor 134, and then can calculate the temperature t of the heating member 133 according to the following operational formula: $t=T+\Delta T$.

In an alternative embodiment, the atomizing device 13 can include two or more heating members 133 and the same number of temperature sensor 134 as the heating members 133. The relationship between the heating member 133 and the temperature sensor 134 can be the same as that in the third embodiment. In an alternative embodiment, the number of the heating member 133 is not equal to the number of the temperature sensor 134. The atomizing device 13 can include at least one temperature sensor 134.

In the third embodiment, because the temperature sensor 134 is configured to sense the change of the temperature t of the heating member 133, the advantages of the electronic cigarette 120 are described as follows.

First, the relational data between the resistance value R of the temperature sensor 134 and the temperature T of the temperature sensor 134 and the following operational formula of the heating member's temperature: $t=T+\Delta T$ can be pre-stored to calculate the temperature t of the heating member 133.

Second, the user can enter the needed target temperature $T_D(T_L \leq T_D \leq T_H)$ to maintain the temperature t of the heating member 133 in $T_D$ through an input unit 145 that is electrically coupled to the processor 142.

Fourth Embodiment

Figure 8:
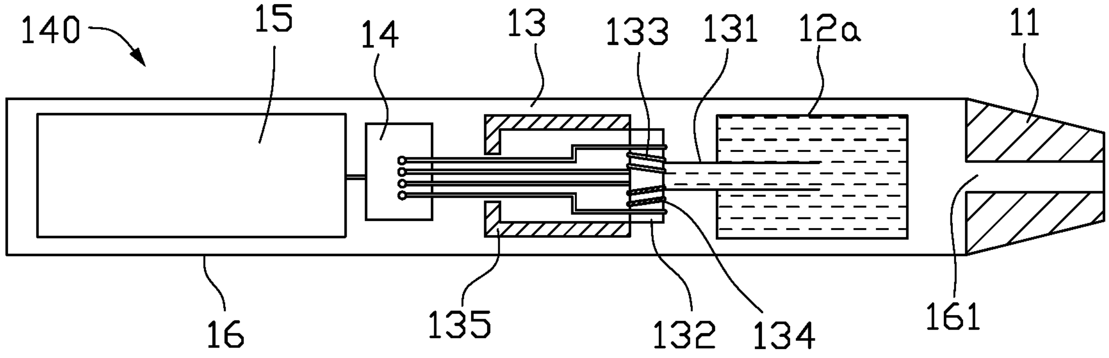
FIG. 8 is a schematic diagram of a fourth embodiment of the electronic cigarette.
Figure 9:
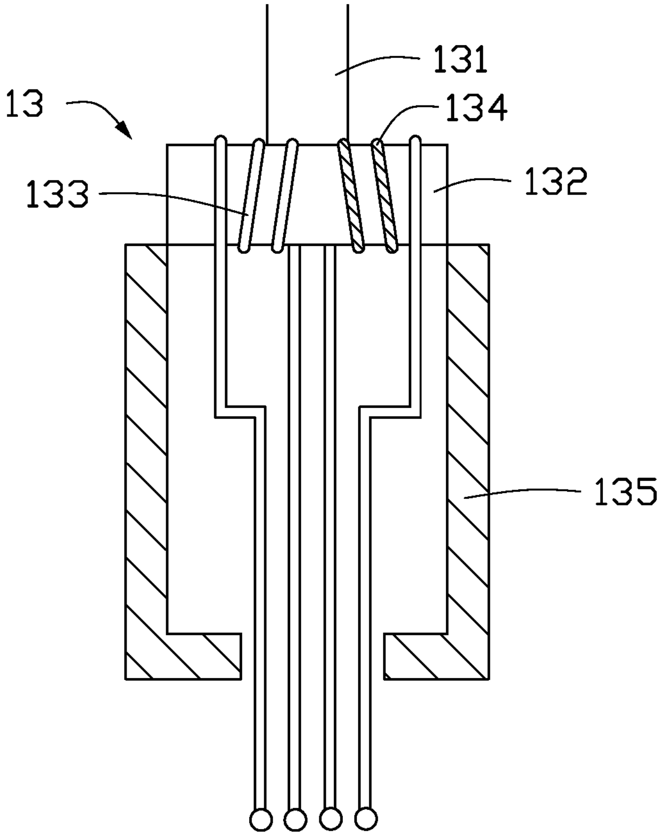
FIG. 9 is a schematic diagram of a fourth embodiment of the atomizing device.

FIGS. 8-9 illustrate an electronic cigarette 140. The difference between the electronic cigarette 140 of the fourth embodiment and the electronic cigarette 130 of the third embodiment can be setting arrangements of the heating member 133 in relation to the temperature sensor 134.

The heating member 133 and the temperature sensor 134 can be cooperatively sleeved on, twined around, adhered to or clinged to the second liquid guiding member 132. A length ratio δ between the temperature sensor 134 and the heating member 133 can be greater than 0 and less than or equal to 1. In an alternative embodiment, the second liquid guiding member 132 can be sleeved on, twined around, adhered to or clinged to both of the heating member 133 and the temperature sensor 134. In an alternative embodiment, the heating member 133 and the temperature sensor 134 can be cooperatively sleeved on, twined around, adhered to or clinged to the first liquid guiding member 131, and the second liquid guiding member 132 can be omitted. In an alternative embodiment, the first liquid guiding member 131 can be sleeved on, twined around, adhered to or clinged to both of the heating member 133 and the temperature sensor 134, and the second liquid guiding member 132 can be omitted. In an alternative embodiment, the heating member 133 can be coated with temperature sensing materials thereon, and the temperature sensor 134 can be omitted. In an alternative embodiment, the heating member 133 can also function as a temperature sensor, for example, the heating member 133 can be made of polymer based PTC material, and the temperature sensor 134 can be omitted. The heating member 133 and the temperature sensor 134 is not directly and electrically coupled to each other in series, but each one can be coupled independently to the control device 14. In an alternative embodiment, the heating member 133 and the temperature sensor 134 can be directly and electrically coupled to each other, and then electrically coupled to the control device 14. Either an insulating bushing (not shown) is sleeved on the temperature sensor 134 or an insulation coating (not shown) is coated on the temperature sensor 134, thus to prevent a direct contact between the temperature sensor 134 and the heating member 133. In the illustrated embodiment, the temperature sensor 134 can be a PTC thermistor.

In the fourth embodiment, the heating member 133 and the temperature sensor 134 are cooperatively sleeved on, twined around, adhered to or clinged to the second liquid guiding member 132 to save space.

Fifth Embodiment

Figure 10:
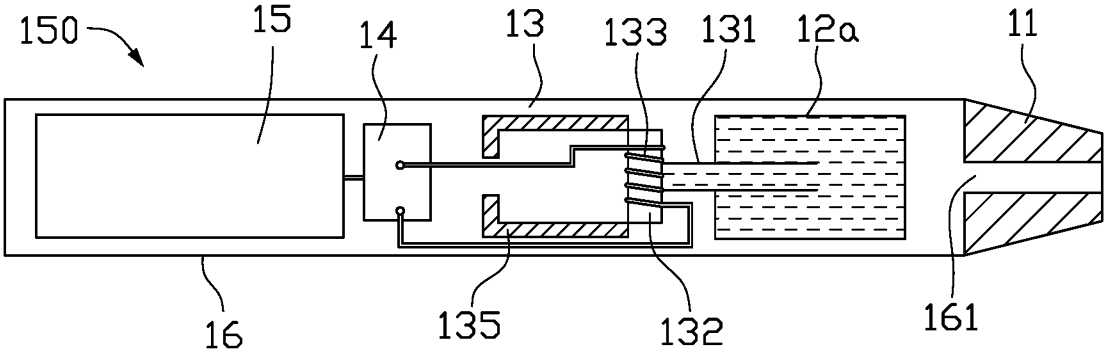
FIG. 10 is a schematic diagram of a fifth embodiment of the electronic cigarette.

FIG. 10 illustrates an electronic cigarette 150. The difference between the electronic cigarette 150 of the fifth embodiment and the electronic cigarette 140 of the fourth embodiment is as follows. Only the heating member 133 can be electrically coupled to the control device 14, and there can be no temperature sensor 134. The heating member 133 can have temperature coefficient of resistance characteristics. The resistance value $R_t$ of the heating member 133 can be increased with the rising temperature t of the heating member 133. The heating member 133 can be made of one or more materials selected from the following components: Pt, Cu, Ni, Ti, Fe, ceramic based PTC, and polymer based PTC.

Figure 11:
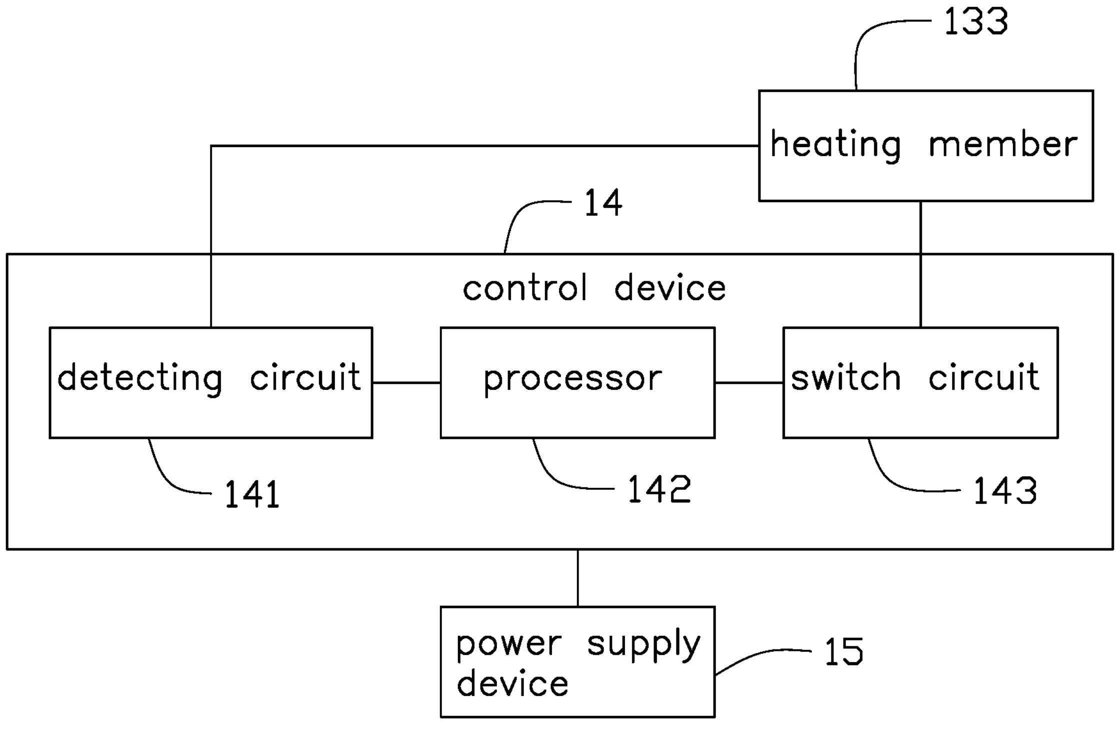
FIG. 11 is a block diagram of a first circuit of the fifth embodiment of the electronic cigarette.

FIG. 11 illustrates a control device 14 can include a detecting circuit 141, a processor 142, and a switch circuit 143. The detecting circuit 141 electrically coupled to the heating member 133 can monitor the resistance $R_t$ of the heating member 133 in real time, and feedback the resistance $R_t$ of the heating member 133 to the processor 142. The processor 142 can pre-store the relational data between the resistance value $R_t$ of the heating member 133 and the temperature t of the heating member 133, the upper operating temperature $T_H$ of the heating member 133, and the lower operating temperature $T_L$ of the heating member 133. The processor 142 can calculate the temperature t of the heating member 133, and then can compare the temperature t of the heating member 133 with the upper operating temperature $T_H$ and the lower operating temperature $T_L$ of the heating member 133, and then can control the switch circuit 143 to switch on or switch off according to the result of comparison. The switch circuit 143 electrically coupled to the heating member 133 can be configured to switch on and allow power to the heating member 133 from the power supply device 15. The switch circuit 143 is also configured to cut off the power to the heating member 133 from the power supply device 15.

The temperature control process of the electronic cigarette 150 is as follows. The resistance value $R_t$ of the heating member 133 can be increased with the rising temperature t of the heating member 133. The detecting circuit 141 can monitor the resistance value $R_t$ of the heating member 133 in real time, and feedback the resistance value $R_t$ of the heating member 133 to the processor 142. The processor 142 can calculate the temperature t of the heating member 133 according to the corresponding relational data between the resistance value $R_t$ of the heating member 133 and the temperature t of the heating member 133, and then can compare the temperature t of the heating member 133 with the upper operating temperature $T_H$ and the lower operating temperature $T_L$ of the heating member 133, and then can control the switch circuit 143 to switch on or switch off according to the result of comparison. When the temperature t of the heating member 133 is less than the upper operating temperature $T_H$, the processor 142 can control the switch circuit 143 to be switched on, and then the power supply device 15 can supply power to the heating member 133, and the temperature t of the heating member 133 can rise; when the temperature t of the heating member 133 is greater than the upper operating temperature $T_H$, the processor 142 can control the switch circuit 143 to be switched off, and then the power supply device 15 can stop supplying power to the heating member 133, and the temperature t of the heating member 133 can drop naturally until the temperature t of the heating member 133 is equal to the lower operating temperature $T_L$. When the temperature t is equal to the lower operating temperature $T_L$, the power supply device 15 can start to supply power to the heating member 133 again.

In an alternative embodiment, the switch circuit 143 can be replaced by an adjusting circuit. When the temperature t of the heating member 133 is greater than the upper operating temperature $T_H$, the adjusting circuit can adjust the power supply device 15 to decrease the output voltage/output power supplied to the heating member 133. When the temperature t of the heating member 133 is less than the lower operating temperature $T_L$ and the output voltage/output power of the power supply device 15 supplied to the heating member 133 is not up to a maximum output voltage/output power, the adjusting circuit can adjust the power supply device 15 to increase the output voltage/output power supplied to the heating member 133. When the temperature t of the heating member 133 is less than the lower operating temperature $T_L$ and the output voltage/output power of the power supply device 15 supplied to the heating member 133 is up to the maximum output voltage/output power, the adjusting circuit can adjust the power supply device 15 to maintain the output voltage/output power supplied to the heating member 133.

Figure 12:
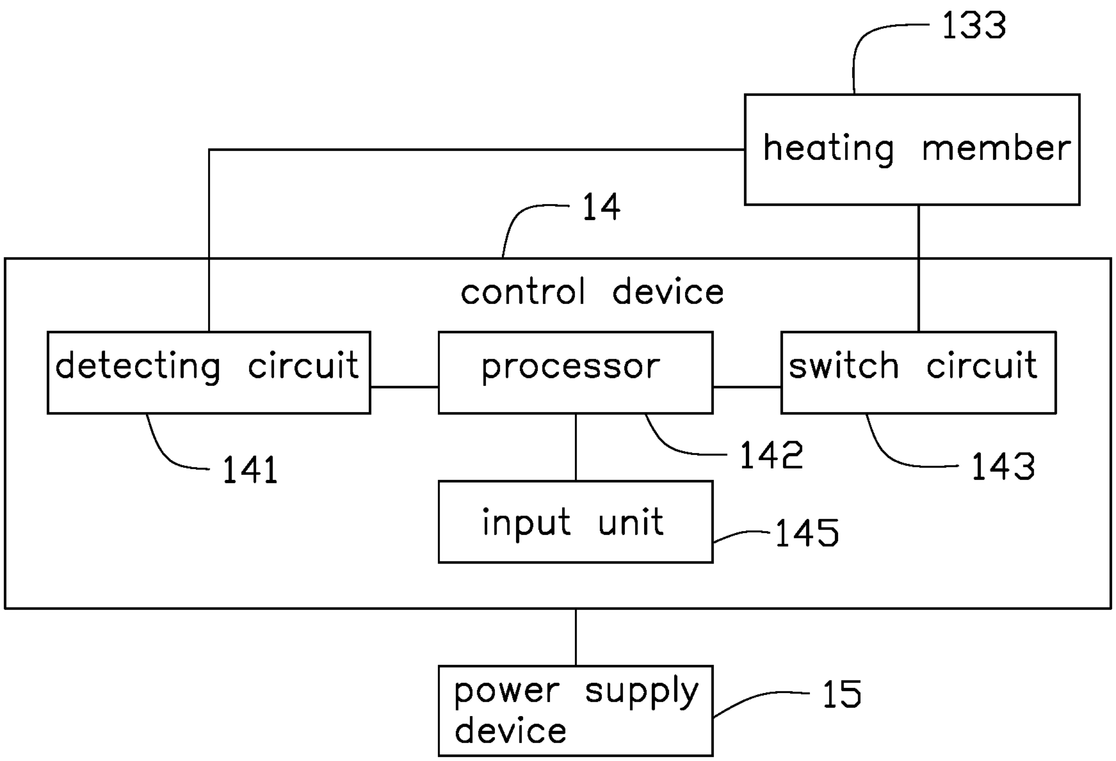
FIG. 12 is a block diagram of a second circuit of the fifth embodiment of the electronic cigarette.

FIG. 12 illustrates that the electronic cigarette 150 can further include an input unit 145 electrically coupled to the processor 142. The input unit 145 can be a physical key or a touch panel for input. The user can enter the target temperature $T_D(T_L \le T_D \le T_H)$ through the input unit 145. The processor 142 can compare the temperature t of the heating member 133 with the target temperature $T_D$. When the temperature t is less than the temperature $T_D$, the processor 142 can control the switch circuit 143 to be switched on, and then the power supply device 15 can supply power to the heating member 133, and the temperature t of the heating member 133 can rise; when the temperature t is greater than the temperature $T_D$, the processor 142 can control the switch circuit 143 to be switched off, and then the power supply device 15 can stop supplying power to the heating member 133, and the temperature t of the heating member 133 can drop naturally. In an alternative embodiment, the switch circuit 143 can be replaced by an adjusting circuit that is configured to adjust the output voltage/output power of the power supply device 15 supplied to the heating member 133.

In an alternative embodiment, the atomizing device 13 can include two or more heating members 133. The relationship between the heating member 133 and the control device 14 can be the same as that in the fifth embodiment.

In the fifth embodiment, because the heating member 133 has temperature coefficient of resistance characteristics, the heating member 133 can directly transmit the change of the temperature t to the control device 14, positioning the temperature control switch or the temperature sensor may not be necessary, and the structure of the electronic cigarette 150 can be simplified, space can be saved in the electronic cigarette 150 and the steps can also be saved in the operation process of the control device 14.

Sixth Embodiment

Figure 13:
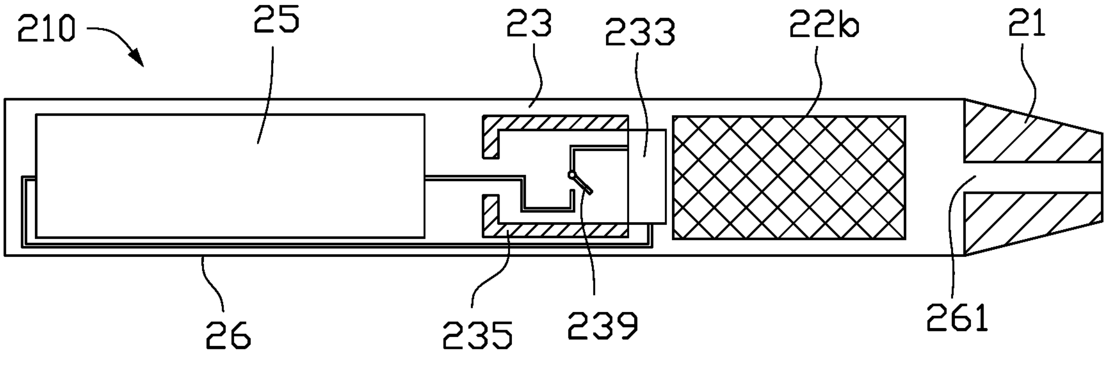
FIG. 13 is a schematic diagram of a sixth embodiment of the electronic cigarette.

FIG. 13 illustrates an electronic cigarette 210. The electronic cigarette 210 can include a suction nozzle 21, a porous liquid storage member **22*b*, an atomizing device 23, a power supply device 25, and a shell 26. An end of the suction nozzle 21 can be coupled to the shell 26. All of the porous liquid storage member 22*b*, the atomizing device 23, and the power supply device 25 can be positioned in the shell 26. The atomizing device 23 can be electrically coupled to the power supply device 25. An end of the shell 26 that is adjacent to the suction nozzle 21 can define a vent hole 261. The vent hole 261 can be in fluid communication with the suction nozzle 21. Smoke liquid that is stored in the porous liquid storage member 22*b* can be carried to the atomizing device 23 through capillary action. After the atomizing device 23 is driven by the power supply device 25**, the smoke liquid is heated and atomized, thus the user can enjoy a smoking experience.

The atomizing device 23 can include a heating member 233, a temperature control switch 239, and an atomizer seat 235. The heating member 233 can be positioned on and in contact with the porous liquid storage member 22*b*. The porous liquid storage member 22*b* can carry the smoke liquid stored therein to the heating member 233 through capillary action. Either the temperature control switch 239 is positioned adjacent to the heating member 233 or the heating member 233 is sleeved on the temperature control switch 239. The temperature control switch 239 can be coupled to the heating member 233 in series. Both of the heating member 233 and the temperature control switch 239 can be electrically coupled to the power supply device 25. The atomizer seat 235 can be configured as the fixing base for at least one of the heating member 233 and the temperature control switch 239, so each component can be received and fastened in the atomizing device 23.

The temperature control switch 239 can have the following properties. When the temperature $t_s$ of the temperature control switch 239 is less than the operating temperature $T_M$, the temperature control switch 239 is switched on. When the temperature $t_s$ of the temperature control switch 239 is greater than the operating temperature $T_M$, the temperature control switch 239 is switched off. The operating temperature $T_M$ of the temperature control switch 239 can be slightly lower than the upper operating temperature $T_H$ of the heating member 233 since the temperature $t_s$ of the temperature control switch 239 is always slightly lower than the temperature t of the heating member 233. The temperature control switch 239 can be selected one or more from the following components: a mechanical temperature control switch, an electronic temperature control switch, a temperature relay, and a combination thereof. The mechanical temperature control switch can include a steam pressure type temperature control switch, a liquid expansion type temperature control switch, a gas adsorption type temperature control switch, and a metal expansion type temperature control switch. The metal expansion type temperature control switch can include a bimetallic strip switch and a memory alloy switch. The electronic temperature control switch can include a resistance type temperature control switch and a thermocouple type temperature control switch. The temperature relay can include a thermal reed relay.

The temperature control process of the electronic cigarette 210 can be the same as that of the first embodiment of the electronic cigarette 110, and not further discussed here.

In an alternative embodiment, the atomizing device 23 can include two or more heating members 233 and the same number of temperature control switches 239. The relationship between the heating member 233 and the temperature control switch 239 can be the same as that in the sixth embodiment. In an alternative embodiment, the number of the heating member 233 is not equal to the number of the temperature control switch 239. The atomizing device 23 can include at least one temperature control switch 239.

In the sixth embodiment, the atomizing device 23 can have a simple structure, and the temperature t of the heating member 233 can be controlled by the temperature control switch 239 alone.

Seventh Embodiment

Figure 14:
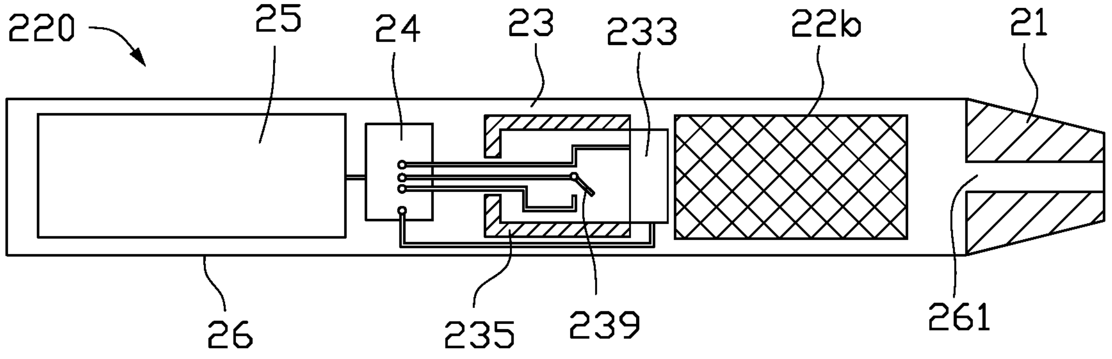
FIG. 14 is a schematic diagram of a seventh embodiment of the electronic cigarette.

FIG. 14 illustrates an electronic cigarette 220. The difference between the electronic cigarette 220 of the seventh embodiment and the electronic cigarette 210 of the sixth embodiment can be that the heating member 233 and the temperature control switch 239 is not directly and electrically coupled to each other in series, but each one can be coupled independently to a control device 24. The control device 24 can be electrically coupled to the power supply device 25. The temperature control switch 239 can have one characteristic of the following characteristics, where each one of such characteristics may signify a plurality of properties; the first, that the temperature control switch 239 can be switched on when the temperature $t_s$ of the temperature control switch 239 is less than the operating temperature $T_M$, and can be switched off when greater. The second is the opposite of the above, namely that the temperature control switch 239 can be switched off when the temperature $t_s$ of the temperature control switch 239 is less than the operating temperature $T_M$, and can be switched on when greater.

The circuits of the control device 24 that are configured to realize the temperature control can be the same as that of the second embodiment, and not further discussed here.

The temperature control process of the electronic cigarette 220 can be the same as that of the second embodiment of the electronic cigarette 120, and not further discussed here.

In an alternative embodiment, the switch circuit configured to switch on and switch off the circuits between the heating member 233 and the power supply device 25 can be replaced by an adjusting circuit that is configured to adjust the output voltage/output power of the power supply device 25 supplied to the heating member 233. The specific implementation process of replacing the switch circuit can be the same as that of the second embodiment, and not further discussed here.

In an alternative embodiment, the atomizing device 23 can include two or more heating members 233 and the same number of control switches 239 as the heating members 233. The relationship between the heating member 233 and the temperature control switch 239 can be the same as that in the seventh embodiment. In an alternative embodiment, the number of the heating member 233 is not equal to the number of the temperature control switch 239. The atomizing device 23 can include at least one temperature control switch 239.

In the seventh embodiment, because the heating member 233 and the temperature control switch 239 is not directly and electrically coupled to each other in series, but each one is coupled independently to the control device 24, the advantages of the seventh embodiment can be the same as that of the second embodiment, and not further discussed here.

Eighth Embodiment

Figure 15:
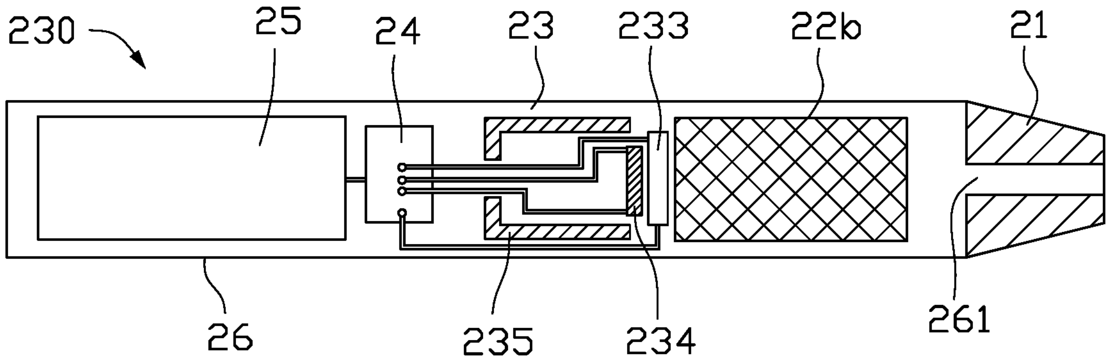
FIG. 15 is a schematic diagram of an eighth embodiment of the electronic cigarette.

FIG. 15 illustrates an electronic cigarette 230. Compared with the seventh embodiment, the difference between the electronic cigarette 230 and the electronic cigarette 220 can be that a temperature sensor 234 replacing the temperature control switch 239 can be electrically coupled to the control device 24.

The temperature sensor 234 can be positioned adjacent to or clinged to the heating member 233. In an alternative embodiment, the temperature sensor 234 can be coated on, twined around, or sleeved on the heating member 233. In an alternative embodiment, the heating member 233 can be coated on, twined around, or sleeved on the temperature sensor 234. The heating member 233 and the temperature sensor 234 are not directly and electrically coupled to each other in series, but each one is coupled independently to the control device 24. In an alternative embodiment, the heating member 233 and the temperature sensor 234 can be directly and electrically coupled to each other in series, and then electrically coupled to the control device 24. The atomizer seat 235 can be configured as a fixing base for at least one of the heating member 233 and the temperature sensor 234, so each component can be received and fastened in the atomizing device 23. Either an insulating bushing (not shown) is sleeved on the temperature sensor 234 or an insulation coating (not shown) is coated on the temperature sensor 234, thus to prevent the direct contact between the temperature sensor 234 and the heating member 233. In the illustrated embodiment, the temperature sensor 234 can be a PTC thermistor.

The circuits of the control device 24 that are configured to realize the temperature control can be the same as that of the third embodiment, and not further discussed here.

The temperature control process of the electronic cigarette 230 can be the same as that of the third embodiment of the electronic cigarette 130, and not further discussed here.

In an alternative embodiment, the switch circuit configured to switch on and switch off the circuits between the heating member 233 and the power supply device 25 can be replaced by an adjusting circuit that is configured to adjust the output voltage/output power of the power supply device 25 supplied to the heating member 233. The specific implementation process of replacing the switch circuit can be the same as that of the third embodiment, and not further discussed here.

The electronic cigarette 230 can further include an input unit, the user can enter the needed target temperature $T_D(T_L \leq T_D \leq T_H)$ through the input unit to maintain the temperature t of the heating member 233 in $T_D$ to work. The input unit can be a physical key or a touch panel for input. The specific implementation process of maintaining the temperature in $T_D$ through the input unit can be the same as that of the third embodiment, and not further discussed here.

In an alternative embodiment, the temperature sensor 234 can be one of the following components: a NTC thermistor, a bimetallic strip, a thermocouple, a quartz crystal temperature sensor, an optical fiber temperature sensor, an infrared temperature sensor or a P-N junction temperature sensor. The control device 24 can calculate the temperature t of the heating member 233 in the calculating method of the third embodiment.

In an alternative embodiment, the atomizing device 23 can include two or more heating members 233 and the same number of temperature sensor 234. The relationship between the heating member 233 and the temperature sensor 234 can be the same as that in the eighth embodiment. In an alternative embodiment, the number of the heating member 233 is not equal to the number of the temperature sensor 234. The atomizing device 23 can include at least one temperature sensor 234.

In the eighth embodiment, because the temperature sensor 234 is configured to sense the change of the temperature t of the heating member 233, the advantages of the eighth embodiment can be the same as that of the third embodiment, and not further discussed here.

Ninth Embodiment

Figure 16:
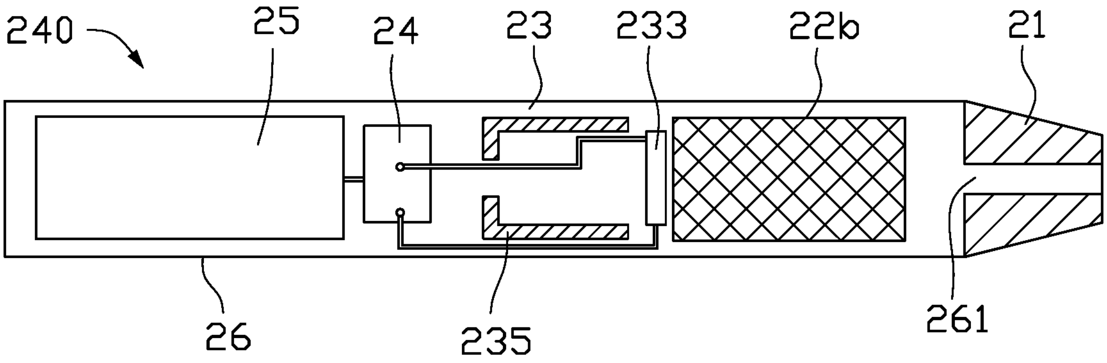
FIG. 16 is a schematic diagram of a ninth embodiment of the electronic cigarette.

FIG. 16 illustrates an electronic cigarette 240. Compared with the eighth embodiment, the difference between the electronic cigarette 240 and the electronic cigarette 230 can be that only the heating member 233 can be electrically coupled to the control device 24, and there can be no temperature sensor 234. The heating member 233 can have temperature coefficient of resistance characteristics. The resistance value $R_t$ of the heating member 233 can be increased with the rising temperature t of the heating member 233. The heating member 233 can be made of one or more from the following materials: Pt, Cu, Ni, Ti, Fe, ceramic base PTC, and polymer based PTC.

The circuits of the control device 24 that are configured to realize the temperature control can be the same as that of the fifth embodiment, and not further discussed here.

The temperature control process of the electronic cigarette 240 can be the same as that of the fifth embodiment of the electronic cigarette 150, and not further discussed here.

In an alternative embodiment, the switch circuit configured to switch on and switch off the circuits between the heating member 233 and the power supply device 25 can be replaced by an adjusting circuit that is configured to adjust the output voltage/output power of the power supply device 25 supplied to the heating member 233. The specific implementation process of replacing the switch circuit can be the same as that of the fifth embodiment, and not further discussed here.

The electronic cigarette 240 can further include an input unit, the user can enter the needed target temperature $T_D(T_L \leq T_D \leq T_H)$ through the input unit to maintain the temperature t of the heating member 233 in $T_D$ to work. The input unit can be a physical key or a touch panel for input. The specific implementation process of maintaining the temperature in $T_D$ through the input unit can be the same as that of the fifth embodiment, and not further discussed here.

In an alternative embodiment, the atomizing device 23 can include two or more heating members 233. The relationship between the heating member 233 and the temperature sensor 234 can be the same as that in the ninth embodiment.

In the ninth embodiment, because the heating member 233 has temperature coefficient of resistance characteristics, the advantages of the ninth embodiment can be the same as that of the fifth embodiment, and not further discussed here.

Tenth Embodiment

Figure 17:
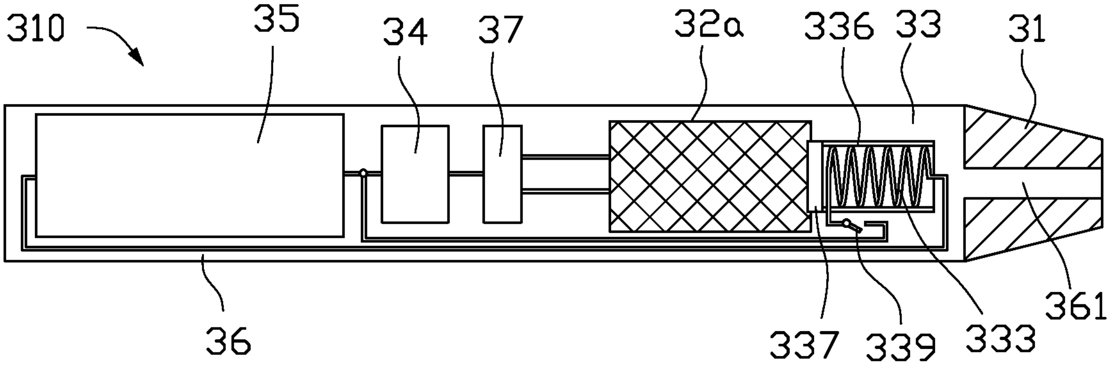
FIG. 17 is a schematic diagram of a tenth embodiment of the electronic cigarette.

FIG. 17 illustrates an electronic cigarette 310. The electronic cigarette 310 can include a suction nozzle 31, a liquid reservoir 32*a*, an atomizing device 33, a control device 34, a power supply device 35, a shell 36, and a micropump 37. An end of the suction nozzle 31 can be coupled to the shell 36. All of the liquid reservoir 32*a*, the atomizing device 33, the micropump 37, the control device 34, and the power supply device 35 can be positioned in the shell 36. The atomizing device 33 and the control device 34 can be independently and electrically coupled to the power supply device 35. An end of the micropump 37 can be in fluid communication with the liquid reservoir 32*a*, and the micropump 37 can be electrically coupled to the control device 34. An end of the shell 36 that is adjacent to the suction nozzle 31 can define a vent hole 361. The vent hole 361 can be in fluid communication with the suction nozzle 31. Smoke liquid that is stored in the liquid reservoir 32*a* can be carried to the atomizing device 33 under the drive of the micropump 37. The smoke liquid can be heated and atomized, thus the user can enjoy a smoking experience. In an alternative embodiment, the micropump 37 can be replaced by other liquid driving devices that can drive the smoke liquid stored in the liquid reservoir 32*a* to spray out, for example, a hyperelastic body, an air bag, or a memory alloy.

The atomizing device 33 can include a heating member 333, a spray tube 336, a pneumatic valve 337, and a temperature control switch 339. An end of the spray tube 336 can be in fluid communication with the liquid reservoir 32*a*. The pneumatic valve 337 can be positioned on a connecting portion (not labeled), the connecting portion is positioned between the liquid reservoir 32*a* and the spray tube 336. The heating member 333 can be positioned in the spray tube 336, electrically coupled to the temperature control switch 339 in series, and configured to heat and atomize the smoke liquid. The temperature control switch 339 being positioned in relation to the spray tube 336 includes one of the following arrangements: an arrangement where the temperature control switch 339 is positioned in the spray tube 336, another arrangement where the temperature control switch 339 is positioned in a spray nozzle of the spray tube 336, a further arrangement where the temperature control switch 339 is positioned on the spray tube 336, and a still further arrangement where the temperature control switch 339 is positioned adjacent to the spray tube 336. In an alternative embodiment, the heating member 333 can be sleeved on the temperature control switch 339. Both of the heating member 333 and the temperature control switch 339 can be electrically coupled to the control device 34.

The temperature control switch 339 can have the following properties. When the temperature $t_s$ of the temperature control switch 339 is less than the operating temperature $T_M$, the temperature control switch 339 can be switched on. When the temperature $t_s$ of the temperature control switch 339 is greater than the operating temperature $T_M$, the temperature control switch 339 can be switched off. The operating temperature $T_M$ of the temperature control switch 339 can be slightly lower than the upper operating temperature $T_H$ of the heating member 333 since the temperature $t_s$ of the temperature control switch 339 is always slightly lower than the temperature t of the heating member 333. The temperature control switch 339 can be selected from at least one of the following components: a mechanical temperature control switch, an electronic temperature control switch, a temperature relay, and a combination thereof. The mechanical temperature control switch can include a steam pressure type temperature control switch, a liquid expansion type temperature control switch, a gas adsorption type temperature control switch, and a metal expansion type temperature control switch. The metal expansion type temperature control switch can include a bimetallic strip switch and a memory alloy switch. The electronic temperature control switch can include a resistance type temperature control switch and a thermocouple type temperature control switch. The temperature relay can include a thermal reed relay.

The temperature control process of the electronic cigarette 310 can be the same as that of the first embodiment of the electronic cigarette 110, and not further discussed here.

The control device 34 can further include a switch circuit configured to switch on and switch off the circuits between the micropump 37 and the power supply device 35. The user may manually switch on and switch off the circuits between the micropump 37 and the power supply device 35, or it may be that the circuits between the micropump 37 and the power supply device 35 can be automatically switched on and switched off through the control device 34. In an alternative embodiment, the switch circuit can be replaced by an adjusting circuit that is configured to adjust the output voltage/output power of the power supply device 35 supplied to the micropump 37.

In an alternative embodiment, the atomizing device 33 can include two or more heating members 333 and the same number of temperature control switches 339. The relationship between the heating member 333 and the temperature control switch 339 can be the same as that in the tenth embodiment. In an alternative embodiment, the number of the heating member 333 is not equal to the number of the temperature control switch 339. The atomizing device 33 can include at least one temperature control switch 339.

In the tenth embodiment, the atomizing device 33 can have a simple structure, and the temperature t of the heating member 333 can be controlled by the temperature control switch 339 alone.

Eleventh Embodiment

Figure 18:
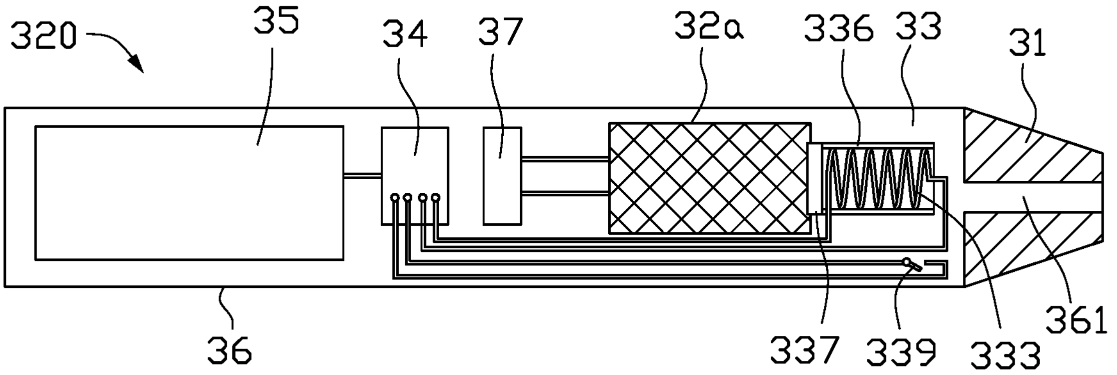
FIG. 18 is a schematic diagram of an eleventh embodiment of the electronic cigarette.

FIG. 18 illustrates an electronic cigarette 320. Compared with the tenth embodiment, the difference between the electronic cigarette 320 and the electronic cigarette 310 can be that the heating member 333 and the temperature control switch 339 cannot be directly and electrically coupled to each other in series, but each one is independently and electrically coupled to a control device 34. The control device 34 can be electrically coupled to the power supply device 35. The temperature control switch 339 can have one characteristic of the following characteristics, where each one of such characteristics may signify a plurality of properties; the first, that the temperature control switch 339 can be switched on when the temperature $t_s$ of the temperature control switch 339 is less than the operating temperature $T_M$, and can be switched off when greater; the second is the opposite of the above, namely that the temperature control switch 339 can be switched off when the temperature $t_s$ of the temperature control switch 339 is less than the operating temperature $T_M$, and can be switched on when greater.

The circuits of the control device 34 that are configured to realize the temperature control can be the same as that of the second embodiment, and not further discussed here.

The temperature control process of the electronic cigarette 320 can be the same as that of the second embodiment of the electronic cigarette 120, and not further discussed here.

The relationship between the control device 34 and the micropump 37 can be the same as that in the tenth embodiment, and not further discussed here.

In an alternative embodiment, the switch circuit configured to switch on and switch off the circuits between the heating member 333 and the power supply device 35 can be replaced by an adjusting circuit that is configured to adjust the output voltage/output power of the power supply device 35 supplied to the heating member 333. The specific implementation process of replacing the switch circuit can be the same as that of the second embodiment, and not further discussed here.

In an alternative embodiment, the atomizing device 33 can include two or more heating members 333 and the same number of temperature control switches 339 as the heating members 333. The relationship between the heating member 333 and the temperature control switch 339 can be the same as that in the eleventh embodiment. In an alternative embodiment, the number of the heating member 333 is not equal to the number of the temperature control switch 339. The atomizing device 33 can include at least one temperature control switch 339.

In the eleventh embodiment, because the heating member 333 and the temperature control switch 339 is not directly and electrically coupled to each other in series, but each one is coupled independently to the control device 34, the advantages of the eleventh embodiment can be the same as that of the second embodiment, and not further discussed here.

Twelfth Embodiment

Figure 19:
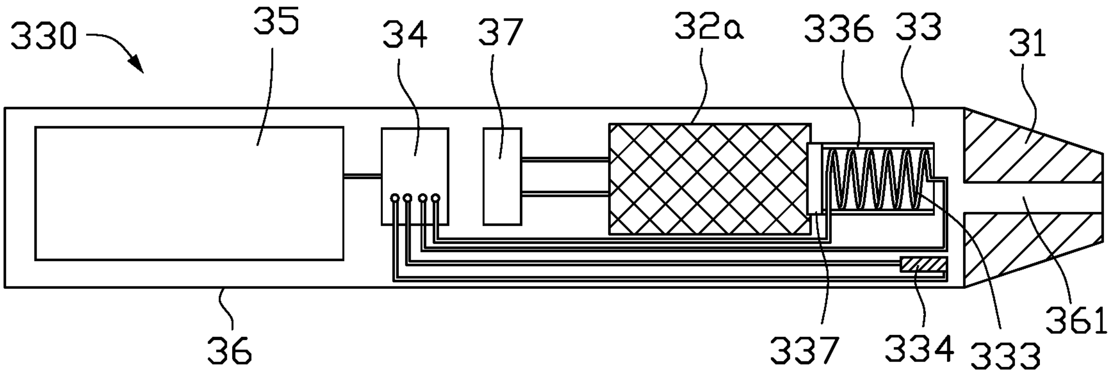
FIG. 19 is a schematic diagram of a twelfth embodiment of the electronic cigarette.

FIG. 19 illustrates an electronic cigarette 330. Compared with the eleventh embodiment, the difference between the electronic cigarette 330 and the electronic cigarette 320 can be that a temperature sensor 334 replacing the temperature control switch 339 can be electrically coupled to the control device 34.

The temperature sensor 334 being positioned in relation to the spray tube 336 includes one of the following arrangements: an arrangement where the temperature sensor 334 is positioned in the spray tube 336, another arrangement where the temperature sensor 334 is positioned in a spray nozzle of the spray tube 336, a further arrangement where the temperature sensor 334 is positioned on the spray tube 336, and a still further arrangement where the temperature sensor 334 is positioned adjacent to the spray tube 336. In an alternative embodiment, the temperature sensor 334 can be coated on, twined around, sleeved on, adhered to or clinged to the heating member 333. In an alternative embodiment, the heating member 333 can be coated on, twined around, sleeved on, adhered to or clinged to the temperature sensor 334. The heating member 333 and the temperature sensor 334 is not directly and electrically coupled to each other in series, but each one is coupled independently to the control device 34. In an alternative embodiment, the heating member 333 and the temperature sensor 334 can be directly and electrically coupled to each other in series, and then electrically coupled to the control device 34. Either an insulating bushing (not shown) is sleeved on the temperature sensor 334 or an insulation coating (not shown) is coated on the temperature sensor 334, thus to avoid the direct contact between the temperature sensor 334 and the heating member 333. In the illustrated embodiment, the temperature sensor 334 can be a PTC thermistor.

The circuits of the control device 34 that are configured to realize the temperature control can be the same as that of the third embodiment, and not further discussed here.

The temperature control process of the electronic cigarette 330 can be the same as that of the third embodiment of the electronic cigarette 130, and not further discussed here.

The relationship between the control device 34 and the micropump 37 can be the same as that in the tenth embodiment, and not further discussed here.

In an alternative embodiment, the switch circuit configured to switch on and switch off the circuits between the heating member 333 and the power supply device 35 can be replaced by an adjusting circuit that is configured to adjust the output voltage/output power of the power supply device 35 supplied to the heating member 333. The specific implementation process of replacing the switch circuit can be the same as that of the third embodiment, and not further discussed here.

The electronic cigarette 330 can further include an input unit, the user can enter the needed target temperature $T_D(T_L \le T_D \le T_H)$ through the input unit to maintain the temperature t of the heating member 333 in $T_D$ to work. The input unit can be a physical key or a touch panel for input. The specific implementation process of maintaining the temperature in $T_D$ through the input unit can be the same as that of the third embodiment, and not further discussed here.

In an alternative embodiment, the temperature sensor 334 can be one of a NTC thermistor, a bimetallic strip, a thermocouple, a quartz crystal temperature sensor, an optical fiber temperature sensor, an infrared temperature sensor, and a P-N junction temperature sensor. The control device 34 can calculate the temperature t of the heating member 333 in the calculating method of the third embodiment.

In an alternative embodiment, the atomizing device 33 can include two or more heating members 333 and the same number of temperature sensors 334 as the heating members 333. The relationship between the heating member 333 and the temperature sensor 334 can be the same as that in the twelfth embodiment. In an alternative embodiment, the number of the heating member 333 is not equal to the number of the temperature sensor 334. The atomizing device 33 can include at least one temperature sensor 334.

In the twelfth embodiment, because the temperature sensor 334 is configured to sense the change of the temperature t of the heating member 333, the advantages of the twelfth embodiment can be the same as that of the third embodiment, and not further discussed here.

Thirteenth Embodiment

Figure 20:
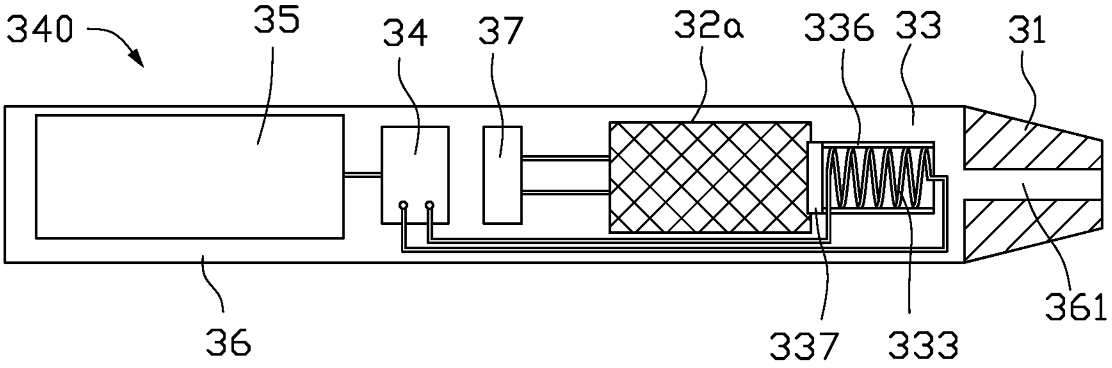
FIG. 20 is a schematic diagram of a thirteenth embodiment of the electronic cigarette.

FIG. 20 illustrates an electronic cigarette 340. Compared with the twelfth embodiment, the difference between the electronic cigarette 340 and the electronic cigarette 330 can be that only the heating member 333 can be electrically coupled to the control device 34, and there can be no temperature sensor 334. The heating member 333 can have temperature coefficient of resistance characteristics. The resistance value $R_t$ of the heating member 333 can be increased with the rising temperature t of the heating member 333. The heating member 333 can be made of one or more from the following materials: Pt, Cu, Ni, Ti, Fe, ceramic base PTC, and polymer based PTC.

The circuits of the control device 34 that are configured to realize the temperature control can be the same as that of the fifth embodiment, and not further discussed here.

The temperature control process of the electronic cigarette 340 can be the same as that of the fifth embodiment of the electronic cigarette 150, and not further discussed here.

The relationship between the control device 34 and the micropump 37 can be the same as that in the tenth embodiment, and not further discussed here.

In an alternative embodiment, the switch circuit configured to switch on and switch off the circuits between the heating member 333 and the power supply device 35 can be replaced by an adjusting circuit that is configured to adjust the output voltage/output power of the power supply device 35 supplied to the heating member 333. The specific implementation process of replacing the switch circuit can be the same as that of the fifth embodiment, and not further discussed here.

The electronic cigarette 340 can further include an input unit, the user can enter the needed target temperature $T_D(T_L \le T_D \le T_H)$ through the input unit to maintain the temperature t of the heating member 333 in $T_D$ to work. The input unit can be a physical key or a touch panel for input. The specific implementation process of maintaining the temperature in $T_D$ through the input unit can be the same as that of the fifth embodiment, and not further discussed here.

In an alternative embodiment, the atomizing device 33 can include two or more heating members 333. The relationship between the heating member 333 and the control device 34 can be the same as that in the thirteenth embodiment.

In the thirteenth embodiment, because the heating member 233 has temperature coefficient of resistance characteristics, the advantages of the thirteenth embodiment can be the same as that of the fifth embodiment, and not further discussed here.

Fourteenth Embodiment

Figure 21:
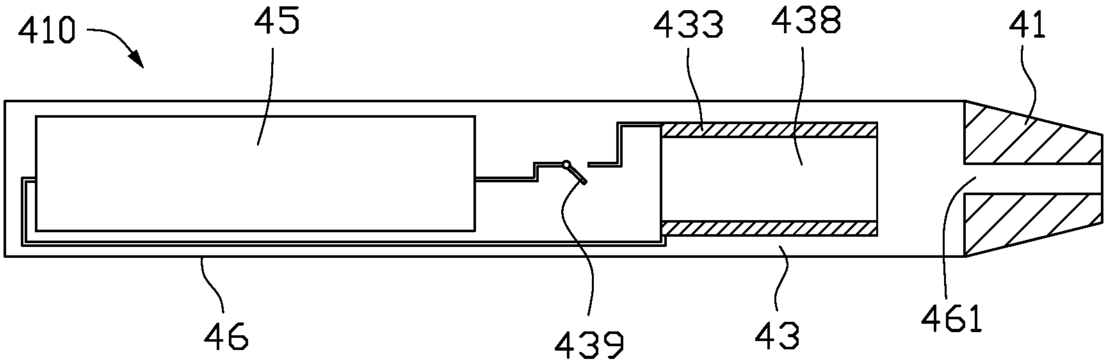
FIG. 21 is a schematic diagram of a fourteenth embodiment of the electronic cigarette.

FIG. 21 illustrates an electronic cigarette 410. The electronic cigarette 410 can include a suction nozzle 41, an atomizing device 43, a power supply device 45, and a shell 46. An end of the suction nozzle 41 can be coupled to the shell 46. Both of the atomizing device 43 and the power supply device 45 can be positioned in the shell 46. The atomizing device 43 can be electrically coupled to the power supply device 45. An end of the shell 46 that is adjacent to the suction nozzle 41 can define a vent hole 464. The vent hole 464 can be in fluid communication with the suction nozzle 41. After the atomizing device 43 is driven by the power supply device 45, the wax or the tobacco stored in the atomizing device 43 can be heated and atomized, thus the user can enjoy a smoking experience.

The atomizing device 43 can include a heating member 433, a container 438 configured for containing wax or tobacco, and a temperature control switch 439. The heating member 433 can be positioned to the container 438 in any of the following arrangements: the heating member 433 can be coated on or twined around an outer wall of the container 438; or the heating member 433 can be added to, embedded in, or sandwiched between inner portions of the wall of the container 438; or the heating member 433 can be embedded on or coated on an inner wall of the container 438; or the heating member 433 can be positioned in the container 438. The heating member 433 can be configured to atomize the wax or the tobacco. The temperature control switch 439 can be positioned adjacent to the heating member 433, and coupled to the heating member 433 in series. Both of the heating member 433 and the temperature control switch 439 can be electrically coupled to the power supply device 45. In an alternative embodiment, the atomizing device 43 can be configured to atomize smoke liquid.

The temperature control switch 439 can have the following properties. When the temperature $t_s$ of the temperature control switch 439 is less than the operating temperature $T_M$, the temperature control switch 439 can be switched on. When the temperature $t_s$ of the temperature control switch 439 is greater than the operating temperature $T_M$, the temperature control switch 439 can be switched off. The operating temperature $T_M$ of the temperature control switch 439 can be slightly lower than the upper operating temperature $T_H$ of the heating member 433 since the temperature $t_s$ of the temperature control switch 439 is always slightly lower than the temperature t of the heating member 433. The temperature control switch 439 can be selected from at least one of the following components: a mechanical temperature control switch, an electronic temperature control switch, a temperature relay, and a combination thereof. The mechanical temperature control switch can include a steam pressure type temperature control switch, a liquid expansion type temperature control switch, a gas adsorption type temperature control switch, and a metal expansion type temperature control switch. The metal expansion type temperature control switch can include a bimetallic strip switch and a memory alloy switch. The electronic temperature control switch can include a resistance type temperature control switch and a thermocouple type temperature control switch. The temperature relay can include a thermal reed relay.

The temperature control process of the electronic cigarette 410 can be the same as that of the first embodiment of the electronic cigarette 110, and not further discussed here.

In an alternative embodiment, the atomizing device 43 can include two or more heating members 433 and the same number of temperature control switches 439 as the heating members 433. The relationship between the heating member 433 and the temperature control switches 439 can be the same as that in the fourteenth embodiment. In an alternative embodiment, the number of the heating member 433 is not equal to the number of the temperature control switch 439. The atomizing device 410 can include at least one temperature control switch 439.

In the fourteenth embodiment, the atomizing device 43 can have a simple structure, and the temperature t of the heating member 433 can be controlled by the temperature control switch 439 alone.

Fifteenth Embodiment

Figure 22:
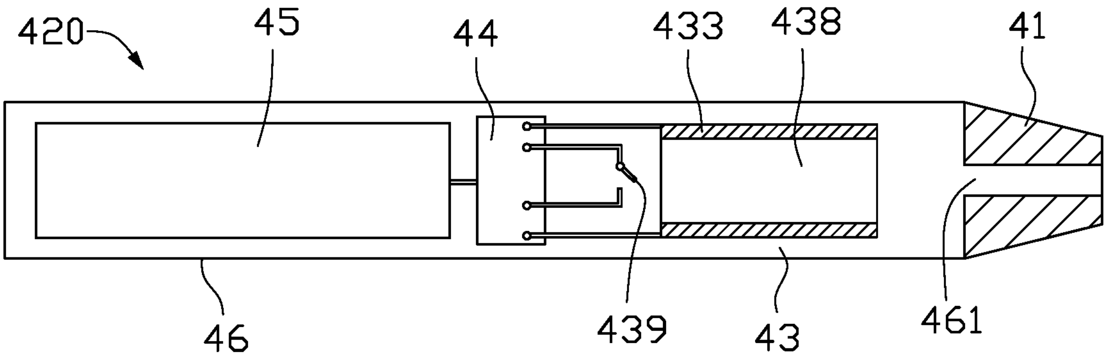
FIG. 22 is a schematic diagram of a fifteenth embodiment of the electronic cigarette.

FIG. 22 illustrates an electronic cigarette 420. Compared with the fourteenth embodiment, the difference between the electronic cigarette 420 and the electronic cigarette 410 can be that the heating member 433 and the temperature control switch 439 is not directly and electrically coupled to each other in series, but each one is coupled independently to a control device 44. The control device 44 can be electrically coupled to the power supply device 45. The temperature control switch 439 can have one characteristic of the following characteristics, where each one of such characteristics may signify a plurality of properties: the first, that the temperature control switch 439 can be switched on when the temperature $t_s$ of the temperature control switch 439 is less than the operating temperature $T_M$, and can be switched off when greater. The second is the opposite of the above, namely that the temperature control switch 439 can be switched off when the temperature $t_s$ of the temperature control switch 439 is less than the operating temperature $T_M$, and can be switched on when greater.

The circuits of the control device 44 that are configured to realize the temperature control can be the same as that of the second embodiment, and not further discussed here.

The temperature control process of the electronic cigarette 420 can be the same as that of the second embodiment of the electronic cigarette 120, and not further discussed here.

In an alternative embodiment, the switch circuit configured to switch on and switch off the circuits between the heating member 433 and the power supply device 45 can be replaced by an adjusting circuit that is configured to adjust the output voltage/output power of the power supply device 45 supplied to the heating member 433. The specific implementation process of replacing the switch circuit can be the same as that of the second embodiment, and not further discussed here.

In an alternative embodiment, the atomizing device 43 can include two or more heating members 433 and the same number of temperature control switches 439. The relationship between the heating member 433 and the temperature control switch 439 can be the same as that in the fourteenth embodiment. In an alternative embodiment, the number of the heating member 433 is not equal to the number of the temperature control switch 439. The atomizing device 43 must include at least one temperature control switch 439.

In the fifteenth embodiment, because the heating member 433 and the temperature control switch 439 is not directly and electrically coupled to each other in series, but each one is coupled independently to the control device 44, the advantages of the fifteenth embodiment can be the same as that of the second embodiment, and not further discussed here.

Sixteenth Embodiment

Figure 23:
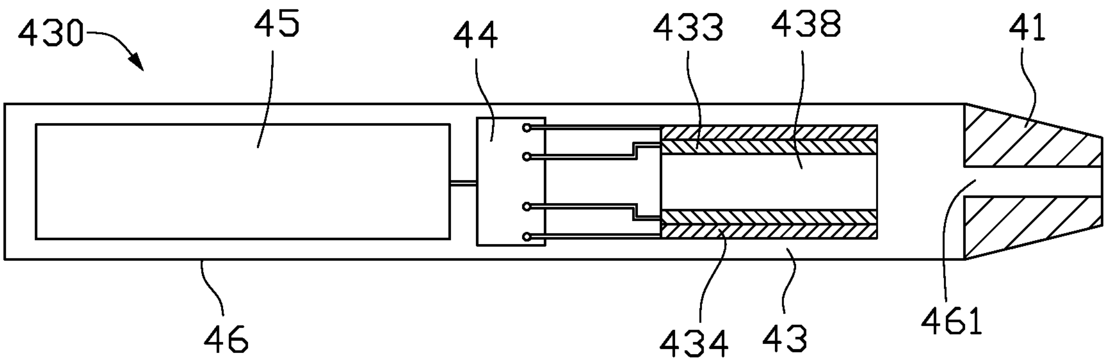
FIG. 23 is a schematic diagram of a sixteenth embodiment of the electronic cigarette.

FIG. 23 illustrates an electronic cigarette 430. Compared with the fifteenth embodiment, the difference between the electronic cigarette 430 and the electronic cigarette 420 can be that a temperature sensor 434 replacing the temperature control switch 439 can be electrically coupled to the control device 44.

The temperature sensor 434 can be sleeved on, coated on, or twined around the heating member 433. The temperature sensor 434 can be electrically coupled to the control device 44, and configured to sense the change of the temperature t of the heating member 433 and feedback the sensing result to the control device 44. In an alternative embodiment, the temperature sensor 434 can be positioned adjacent to or clinged to the heating member 433. In an alternative embodiment, the heating member 433 can not only act as the heating member but also act as the temperature sensor, for example, the heating member 133 can be made of ceramic based PTC material, thus the temperature sensor 434 can be omitted. Either an insulating bushing (not shown) is sleeved on the temperature sensor 434 or an insulation coating (not shown) is coated on the temperature sensor 434, thus to avoid the direct contact between the temperature sensor 434 and the heating member 433. In the illustrated embodiment, the temperature sensor 434 can be a PTC thermistor.

The circuits of the control device 44 that are configured to realize the temperature control can be the same as that of the third embodiment, and not further discussed here.

The temperature control process of the electronic cigarette 430 can be the same as that of the third embodiment of the electronic cigarette 130, and not further discussed here.

In an alternative embodiment, the switch circuit configured to switch on and switch off the circuits between the heating member 433 and the power supply device 45 can be replaced by an adjusting circuit that is configured to adjust the output voltage/output power of the power supply device 45 supplied to the heating member 433. The specific implementation process of replacing the switch circuit can be the same as that of the third embodiment, and not further discussed here.

The electronic cigarette 430 can further include an input unit, the user can enter the needed target temperature $T_D(T_L \leq T_D \leq T_H)$ through the input unit to maintain the temperature t of the heating member 433 in $T_D$ to work. The input unit can be a physical key or a touch panel for input. The specific implementation process of maintaining the temperature in $T_D$ through the input unit can be the same as that of the third embodiment, and not further discussed here.

In an alternative embodiment, the temperature sensor 434 can be one of a NTC thermistor, a bimetallic strip, a thermocouple, a quartz crystal temperature sensor, an optical fiber temperature sensor, an infrared temperature sensor, and a P-N junction temperature sensor. The control device 44 can calculate the temperature t of the heating member 433 in the calculating method of the third embodiment.

In an alternative embodiment, the atomizing device 43 can include two or more heating members 433 and the same number of temperature sensors 434 as the heating members 433. The relationship between the heating member 433 and the temperature sensor 434 can be the same as that in the sixteenth embodiment. In an alternative embodiment, the number of the heating member 433 is not equal to the number of the temperature sensor 434. The atomizing device 43 must include at least one temperature sensor 434.

In the sixteenth embodiment, because the temperature sensor 434 is configured to sense the change of the temperature t of the heating member 433, the advantages of the sixteenth embodiment can be the same as that of the third embodiment, and not further discussed here.

Seventeenth Embodiment

Figure 24:
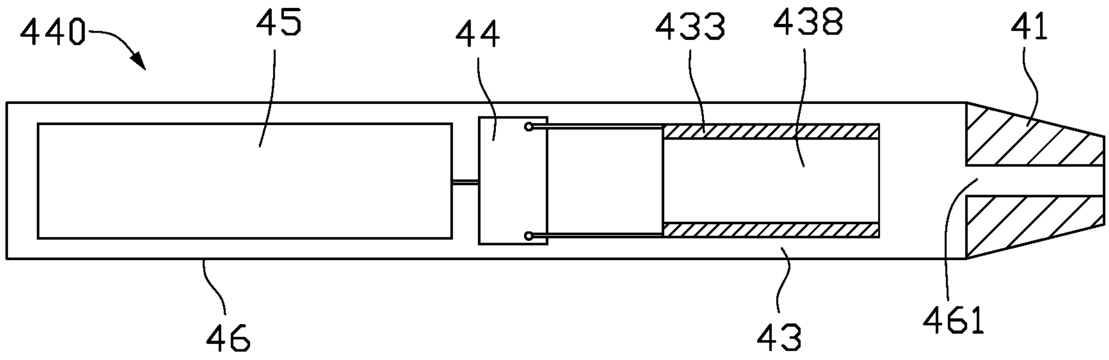
FIG. 24 is a schematic diagram of a seventeenth embodiment of the electronic cigarette.

FIG. 24 illustrates an electronic cigarette 440. Compared with the sixteenth embodiment, the difference between the electronic cigarette 440 and the electronic cigarette 430 can be that only the heating member 433 can be electrically coupled to the control device 44, and there can be no temperature sensor 434. The heating member 433 can have temperature coefficient of resistance characteristics. The resistance value $R_t$ of the heating member 433 can be increased with the rising of the temperature t of the heating member 433. The heating member 433 can be made of at least one of the following materials: Pt, Cu, Ni, Ti, Fe, ceramic base PTC, and polymer based PTC.

The circuits of the control device 44 that are configured to realize the temperature control can be the same as that of the fifth embodiment, and not further discussed here.

The temperature control process of the electronic cigarette 440 can be the same as that of the fifth embodiment of the electronic cigarette 150, and not further discussed here.

In an alternative embodiment, the switch circuit configured to switch on and switch off the circuits between the heating member 433 and the power supply device 45 can be replaced by an adjusting circuit that is configured to adjust the output voltage/output power of the power supply device 45 supplied to the heating member 433. The specific implementation process of replacing the switch circuit can be the same as that of the fifth embodiment, and not further discussed here.

The electronic cigarette 440 can further include an input unit, the user can enter the needed target temperature $T_D(T_L \leq T_D \leq T_H)$ through the input unit to maintain the temperature t of the heating member 433 in $T_D$ to work. The input unit can be a physical key or a touch panel for input. The specific implementation process of maintaining the temperature in $T_D$ through the input unit can be the same as that of the fifth embodiment, and not further discussed here.

In an alternative embodiment, the atomizing device 43 can include two or more heating members 433. The relationship between the heating member 433 and the control device 44 can be the same as that in the seventeenth embodiment.

In the seventeenth embodiment, because the heating member 433 has temperature coefficient of resistance characteristics, the advantages of the seventeenth embodiment can be the same as that of the fifth embodiment, and not further discussed here.

The embodiments shown and described above are only examples. Many details are often found in the art, such as features of control system and control method for vehicle anti-theft. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. Therefore, those of ordinary skill in the art can make various modifications to the embodiments without departing from the scope of the disclosure, as defined by the appended claims.

What is claimed is:

1. An atomizing device comprising:

a temperature control switch; and a heating member coupled to the temperature control switch in series;

wherein the temperature control switch is positioned adjacent to the heating member or the heating member is sleeved on the temperature control switch, the heating member and the temperature control switch are electrically coupled to a power supply device;

wherein the temperature control switch is provided for directly controlling a temperature of the heating member; and when a temperature $t_s$ of the temperature control switch is less than an operating temperature $T_M$, the temperature control switch is switched on, when the temperature $t_s$ is greater than the operating temperature $T_M$, the temperature control switch is switched off.

2. The atomizing device of claim 1, further comprising:

a spray tube having an end in fluid communication with a liquid reservoir; and a pneumatic valve positioned on a connecting portion, and the connecting portion is positioned between the liquid reservoir and the spray tube.

3. The atomizing device of claim 2, wherein the heating member is positioned in the spray tube; and wherein the temperature control switch being positioned in relation to the spray tube includes the following arrangements, wherein an arrangement where the temperature control switch is positioned in the spray tube; wherein another arrangement where the temperature control switch is positioned in a spray nozzle of the spray tube; wherein a further arrangement where the temperature control switch is positioned on the spray tube; and wherein a still further arrangement where the temperature control switch is positioned adjacent to the spray tube.

4. An electronic cigarette comprising:

an atomizing device comprising:

a temperature control switch; and a heating member coupled to the temperature control switch in series;

wherein the temperature control switch is positioned adjacent to the heating member or the heating member is sleeved on the temperature control switch; and a power supply device;

wherein the heating member and the temperature control switch are electrically coupled to the power supply device;

wherein the temperature control switch is provided for directly controlling a temperature of the heating member; and when a temperature $t_s$ of the temperature control switch is less than an operating temperature $T_M$, the temperature control switch is switched on, when the temperature $t_s$ is greater than the operating temperature $T_M$, the temperature control switch is switched off.

5. A atomizing device comprising:

a heating member; and a temperature control switch;

wherein the heating member and the temperature control switch are independently and electrically coupled to a control device, the temperature control switch is positioned adjacent to the heating member or the heating member is sleeved on the temperature control switch;

wherein the temperature control switch is provided for directly controlling a temperature of the heating member; and when a temperature $t_s$ of the temperature control switch is less than an operating temperature $T_M$, the temperature control switch is switched on, when the temperature $t_s$ is greater than the operating temperature $T_M$, the temperature control switch is switched off.

6. The atomizing device of claim 5, further comprising:

a spray tube having an end in fluid communication with the liquid reservoir; and a pneumatic valve positioned on a connecting portion, and the connecting portion is positioned between a liquid reservoir and the spray tube.

7. The atomizing device of claim 6, wherein the heating member is positioned in the spray tube; and wherein the temperature control switch being positioned in relation to the spray tube includes the following arrangements, wherein an arrangement where the temperature control switch is positioned in the spray tube, wherein another arrangement where the temperature control switch is positioned in a spray nozzle of the spray tube, a further arrangement where the temperature control switch is positioned on the spray tube, and a still further arrangement where the temperature control switch is positioned adjacent to the spray tube.

* * * * *